United States Patent [19]

Graves et al.

[11] Patent Number: 4,993,131
[45] Date of Patent: Feb. 19, 1991

[54] METHOD AND APPARATUS OF INFINITELY SIZING A MINI BLIND

[75] Inventors: Delbert B. Graves, Nora; Roger L. Anderson, McConnell, both of Ill.

[73] Assignee: Newell Operating Company, Freeport, Ill.

[21] Appl. No.: 234,709

[22] Filed: Aug. 19, 1988

[51] Int. Cl.⁵ ............................................. B23D 19/04
[52] U.S. Cl. .......................................... 29/24.5; 29/433
[58] Field of Search ................................. 29/24.5, 433

[56] References Cited
U.S. PATENT DOCUMENTS 4,730,372 3/1988 Tsuchida ............................. 29/24.5

*Primary Examiner*—Timothy V. Eley
*Attorney, Agent, or Firm*—James G. Staples

[57] ABSTRACT

A method of shortening the width, that is, sizing a mini blind to any specified dimension by an operator having the skill level found in a retail outlet, is disclosed. In addition, a machine for sizing a mini blind to any specified dimension by an operator having the skill level found in a retail outlet is also disclosed. The method and machine are applicable to mini blinds which require either one or several ladders to be affixed to the blind and hence the operation of one or more drill systems, the number being proportional to the width of the blind.

46 Claims, 19 Drawing Sheets

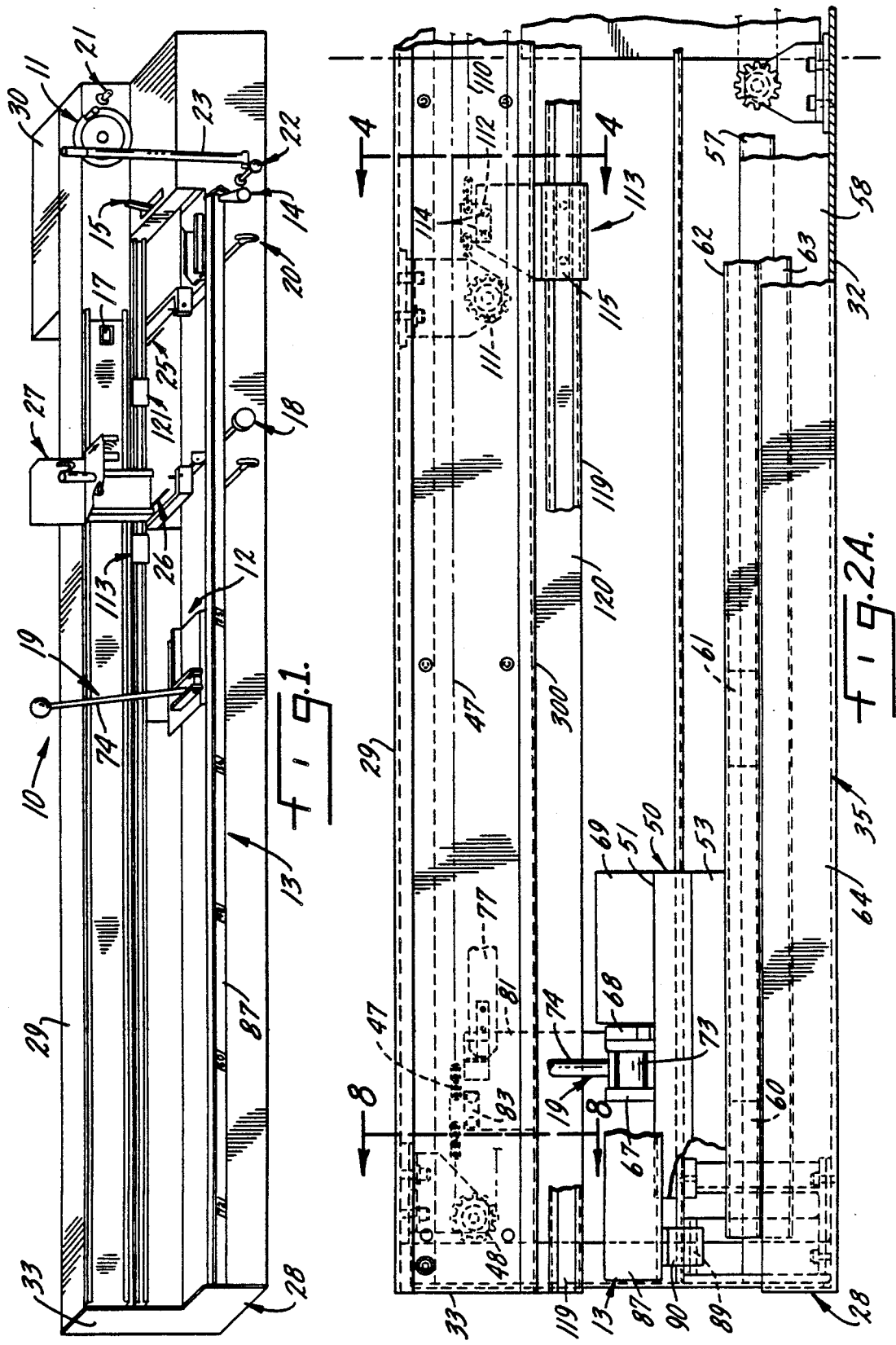

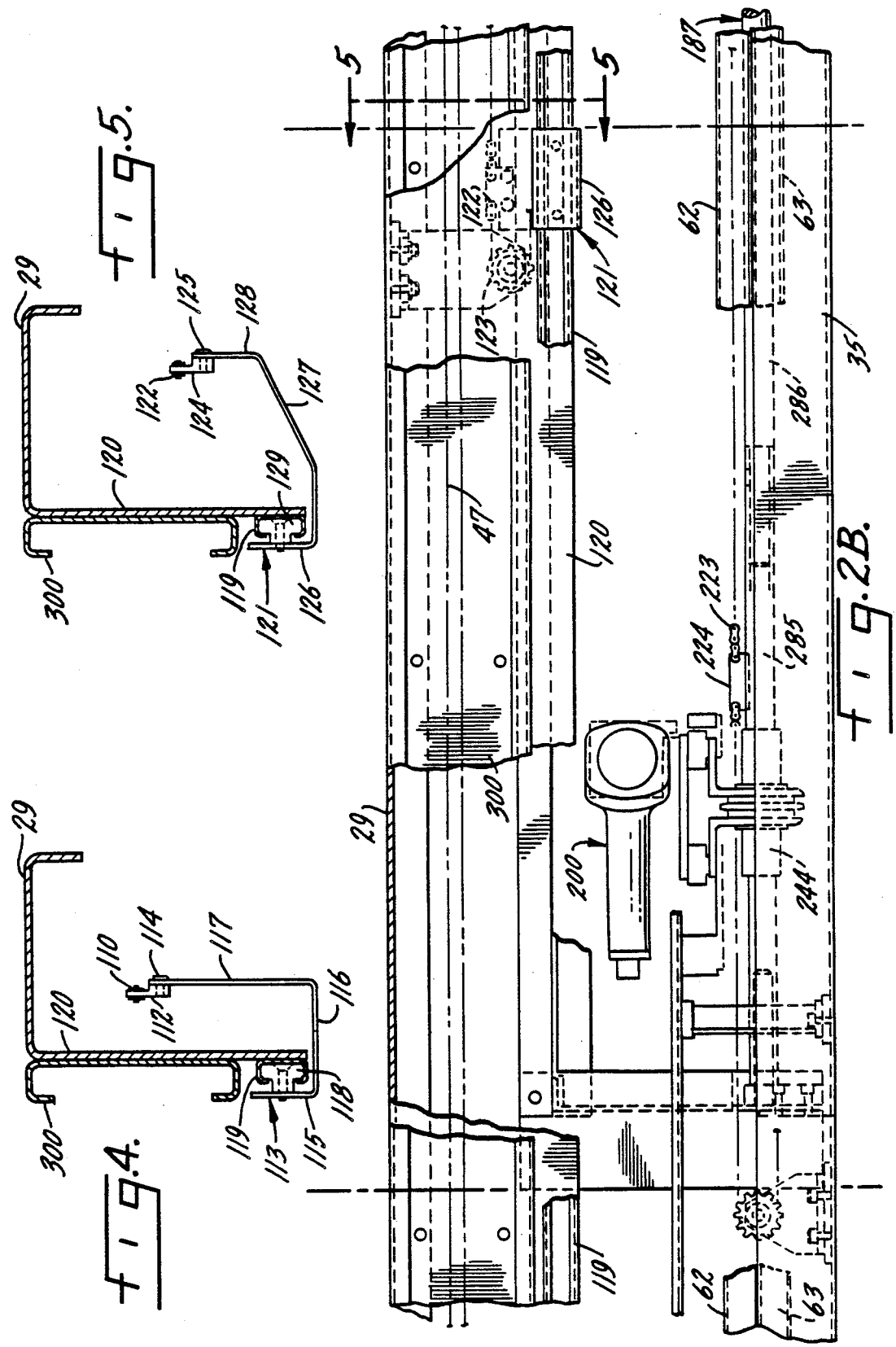

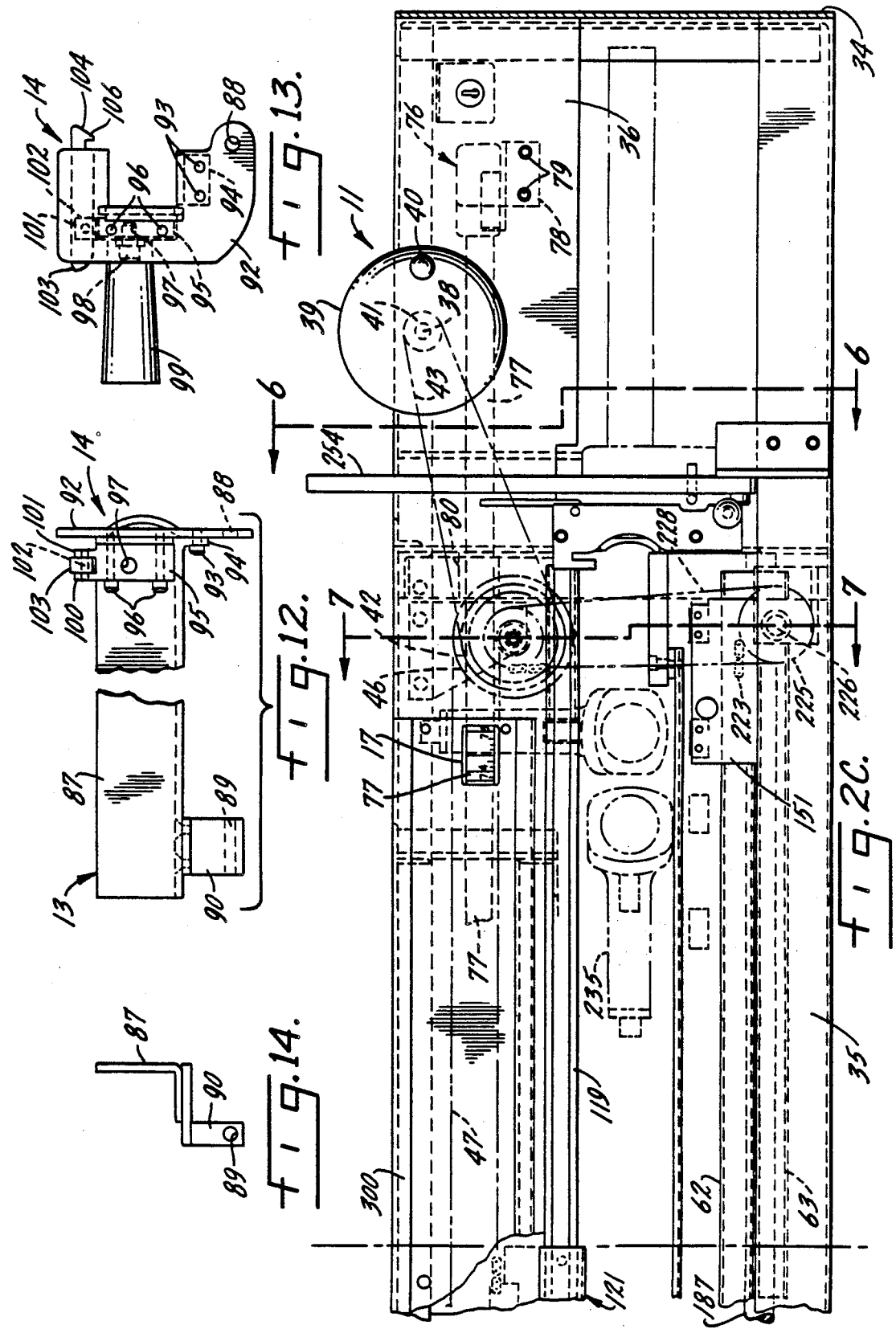

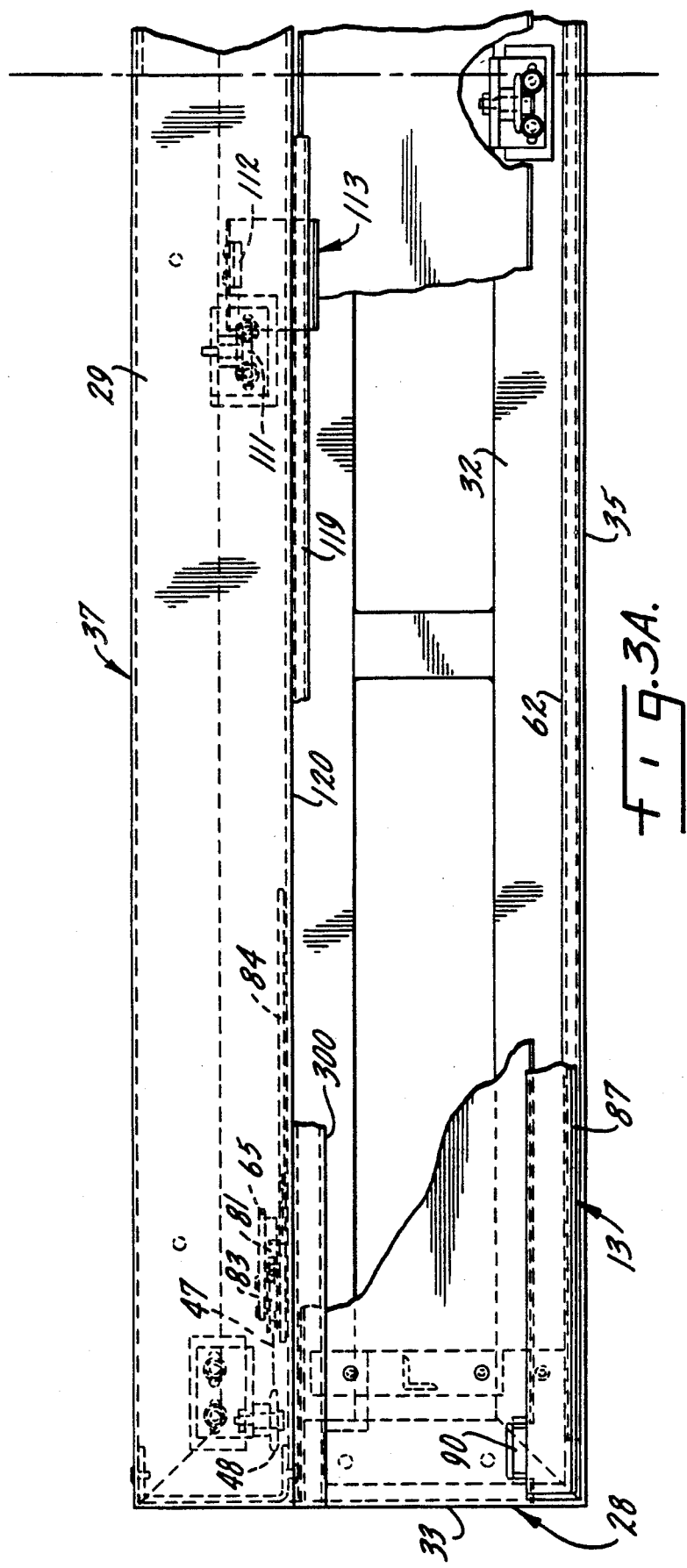

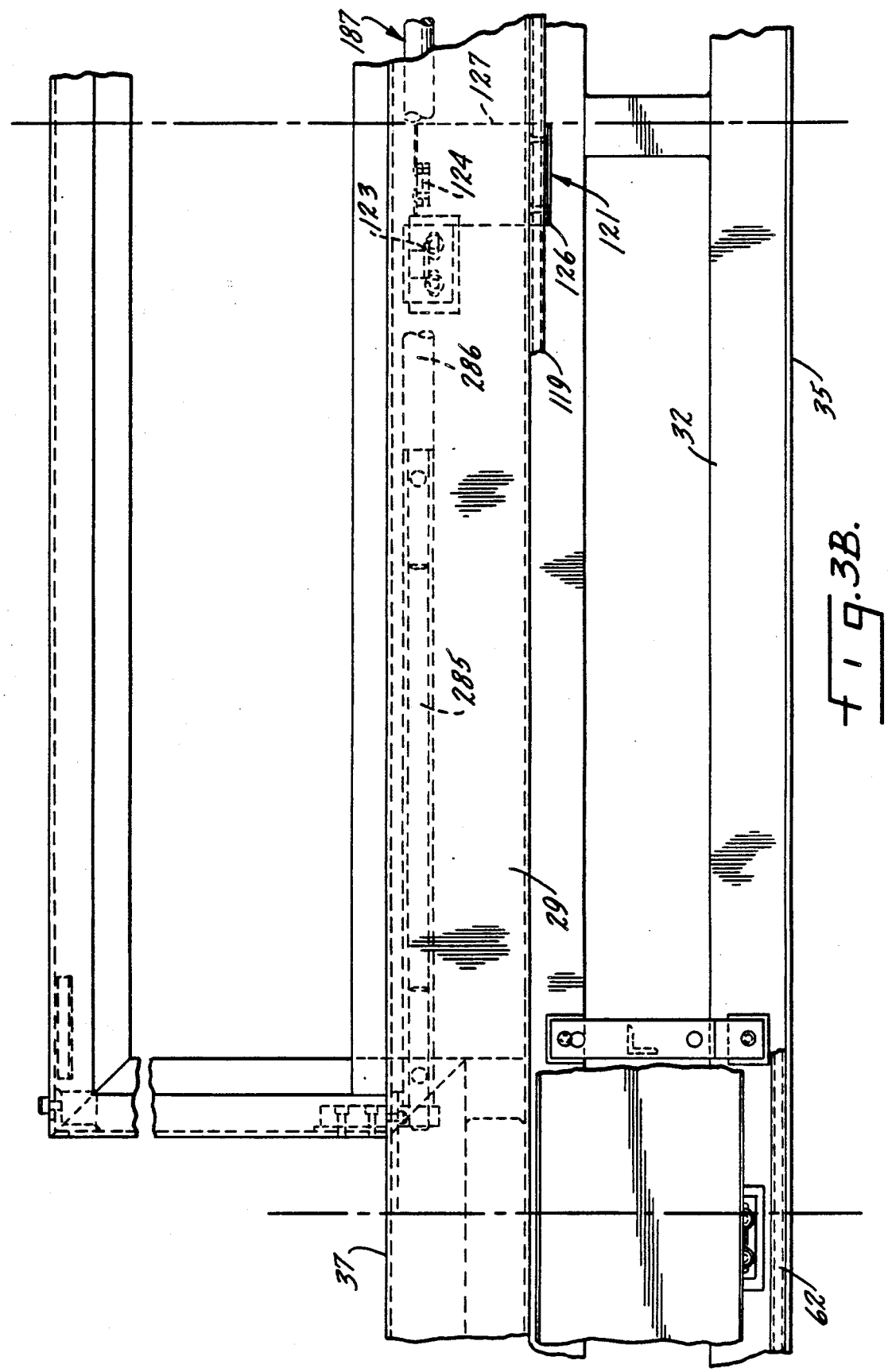

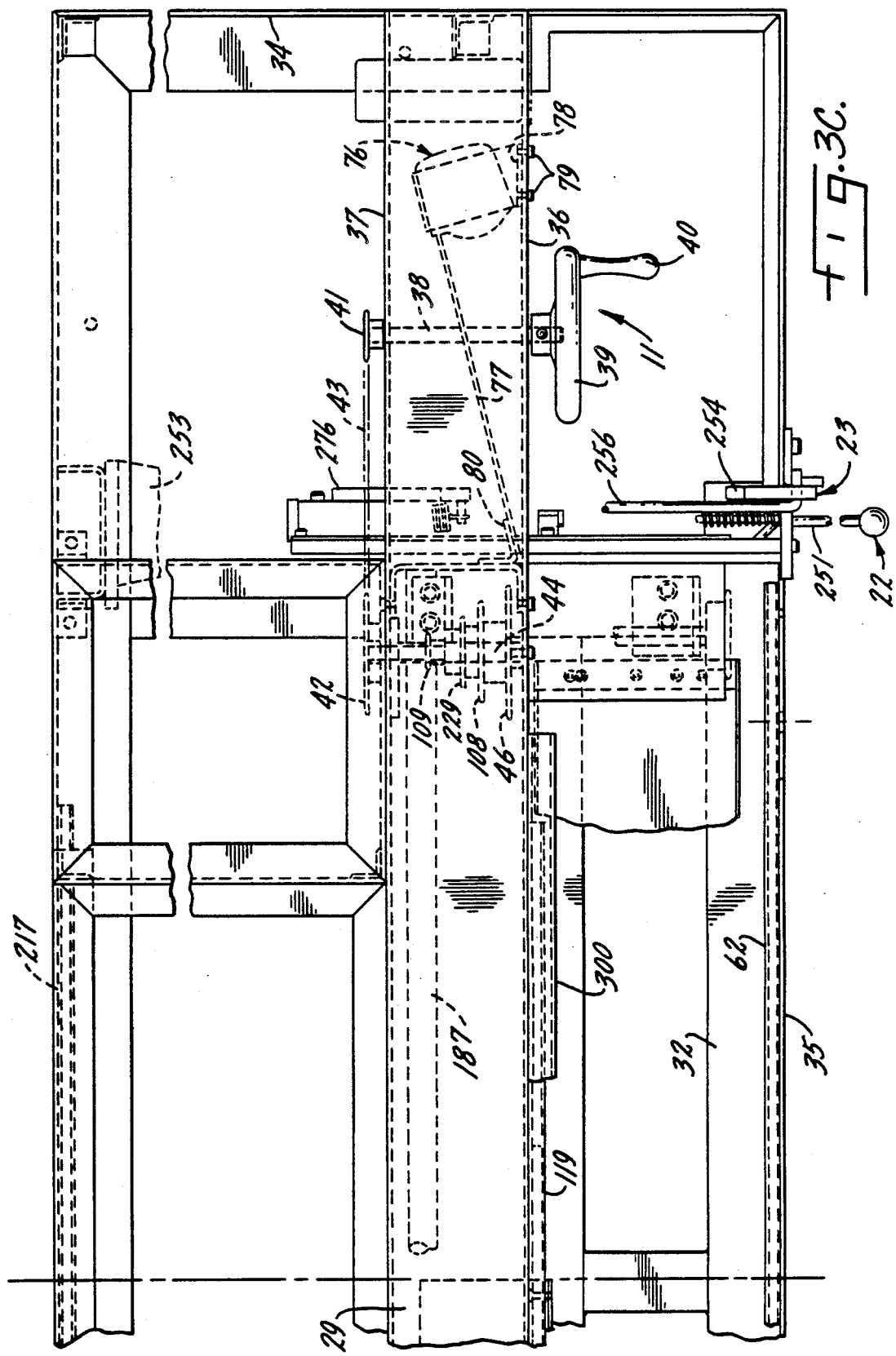

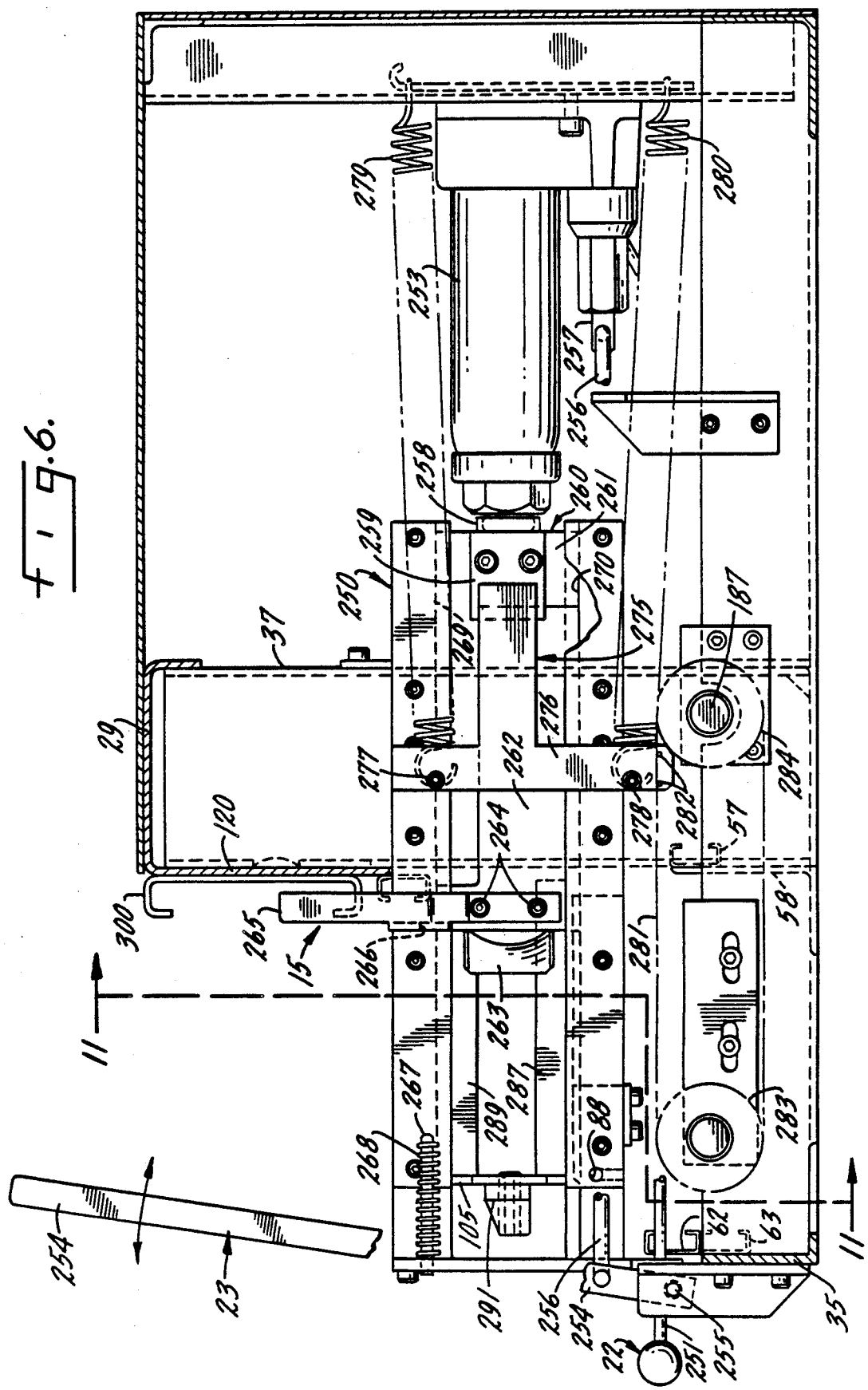

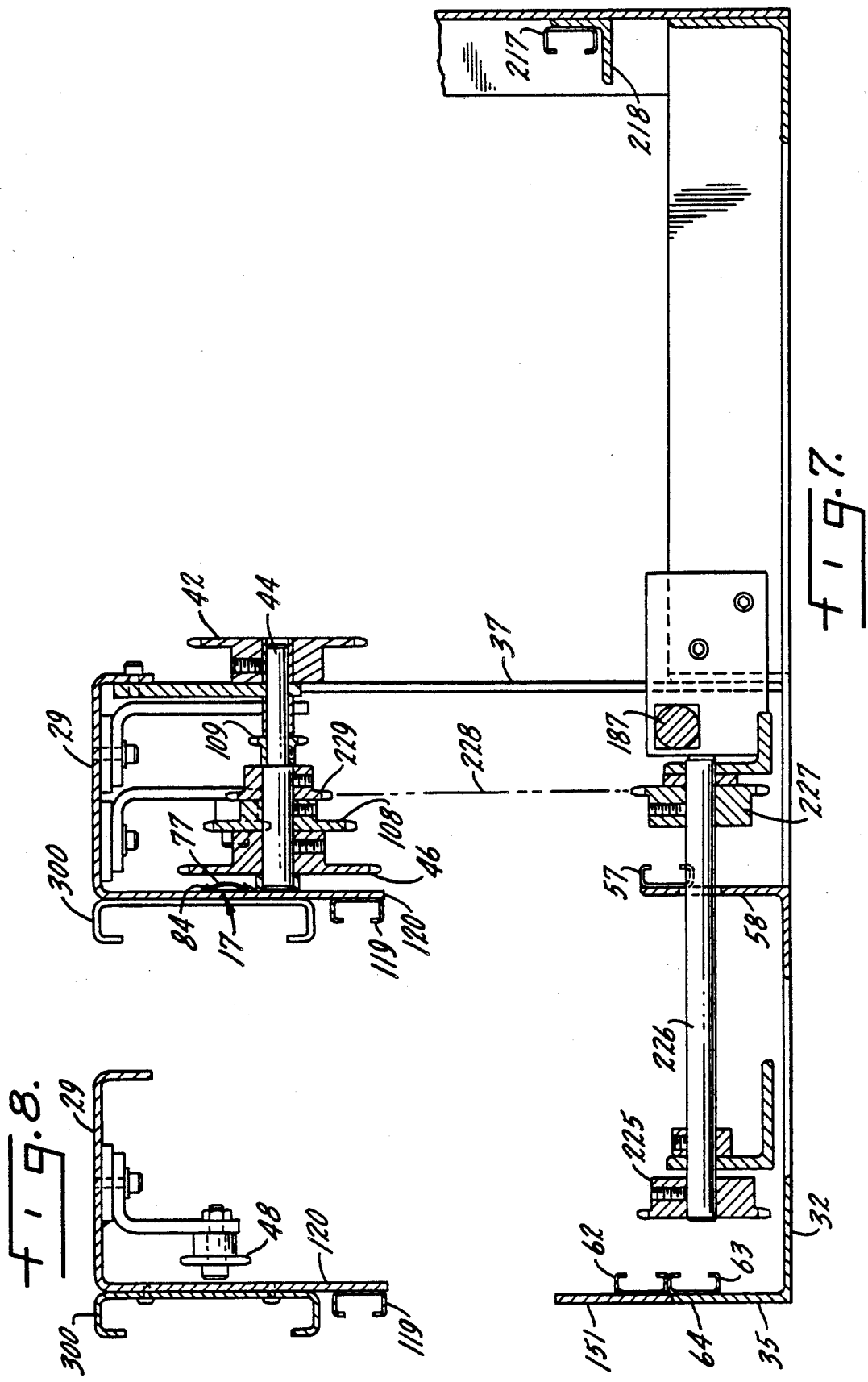

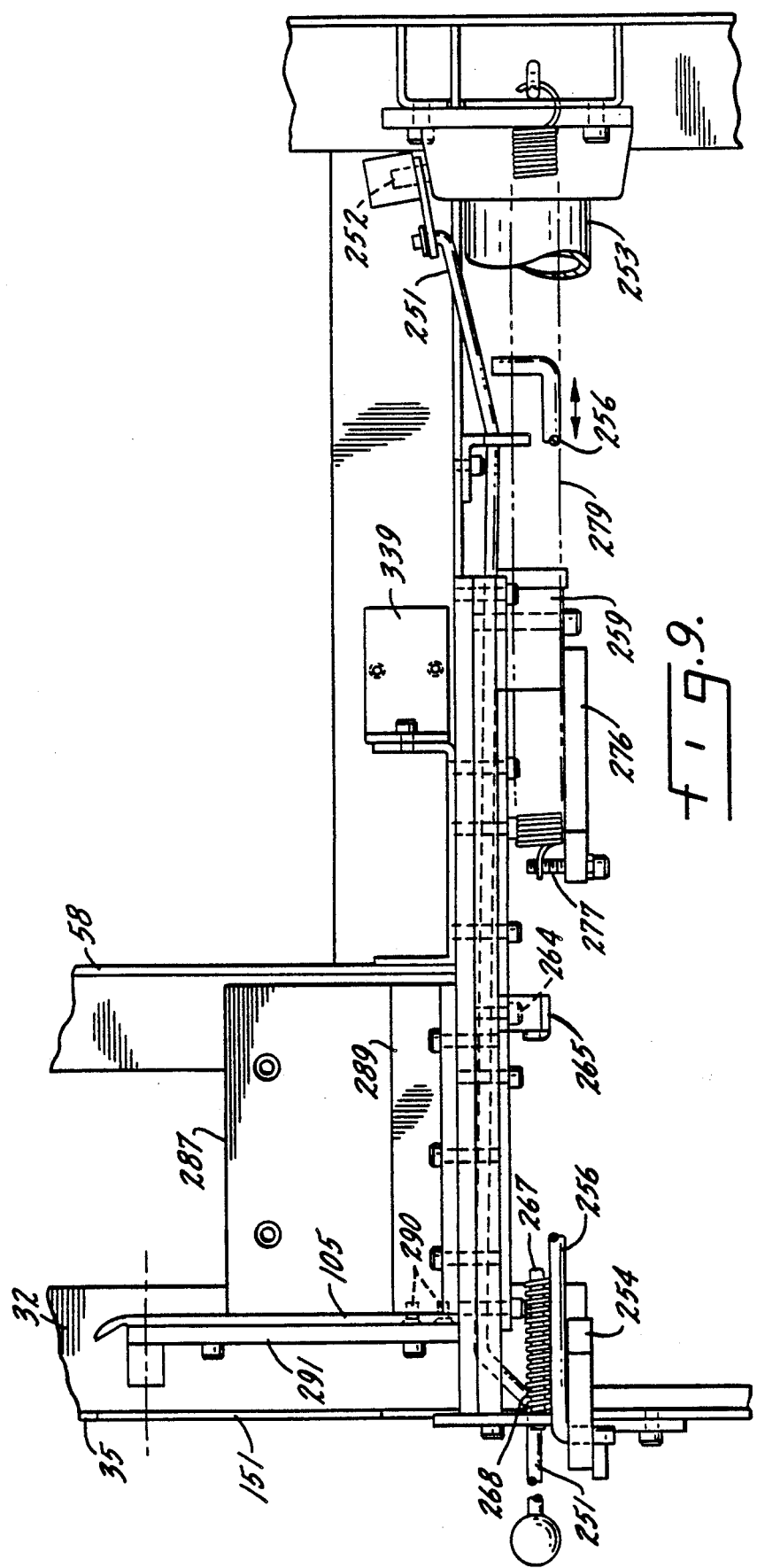

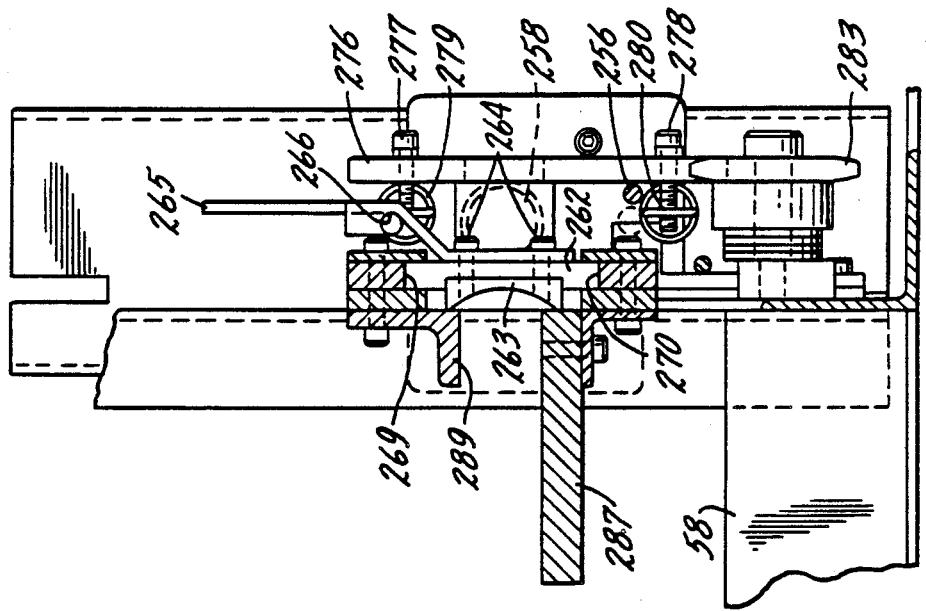
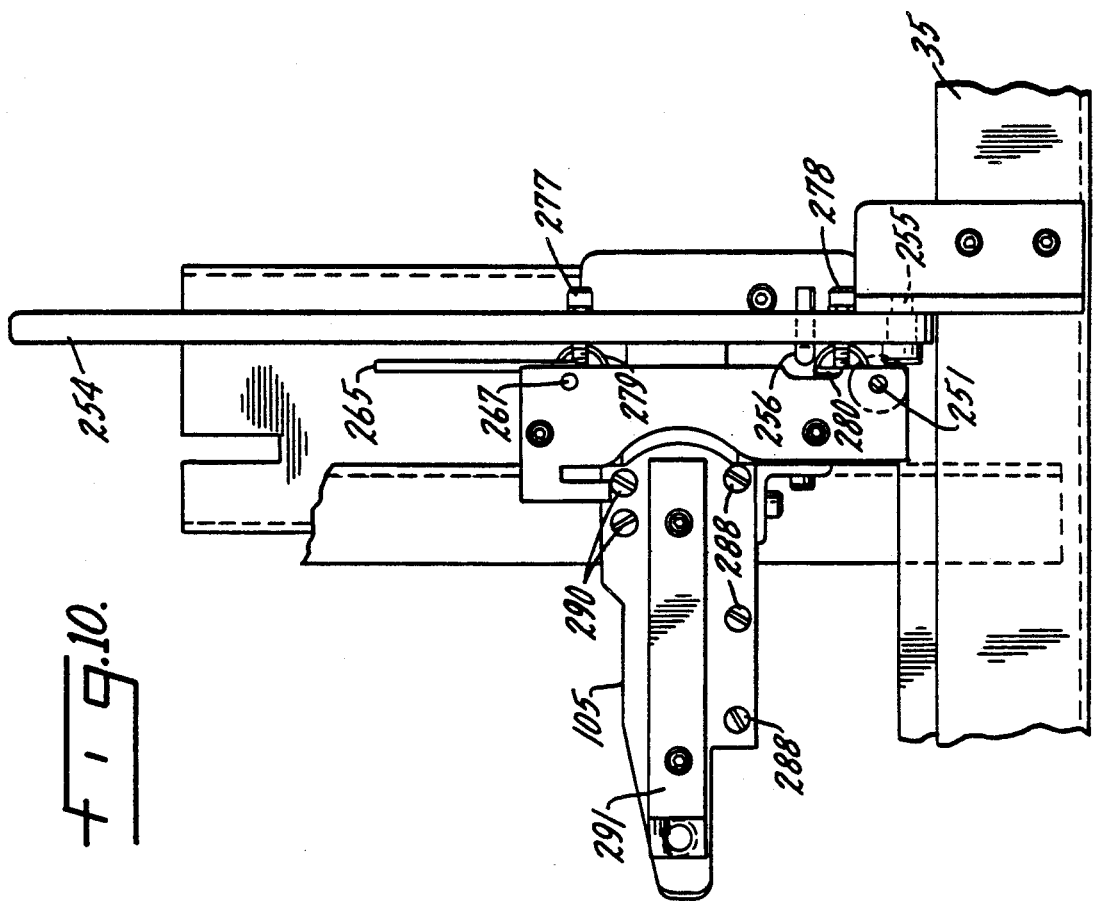

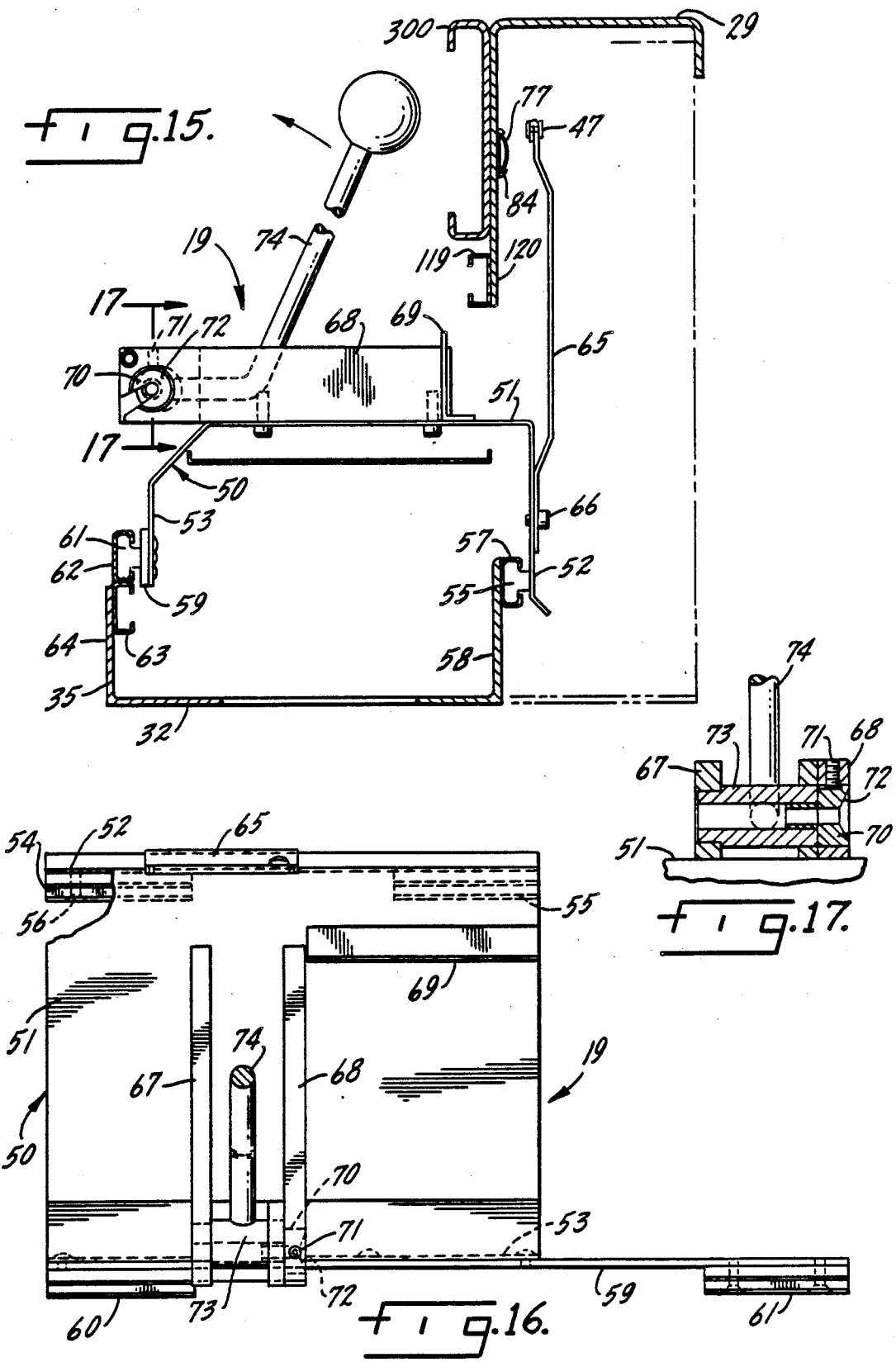

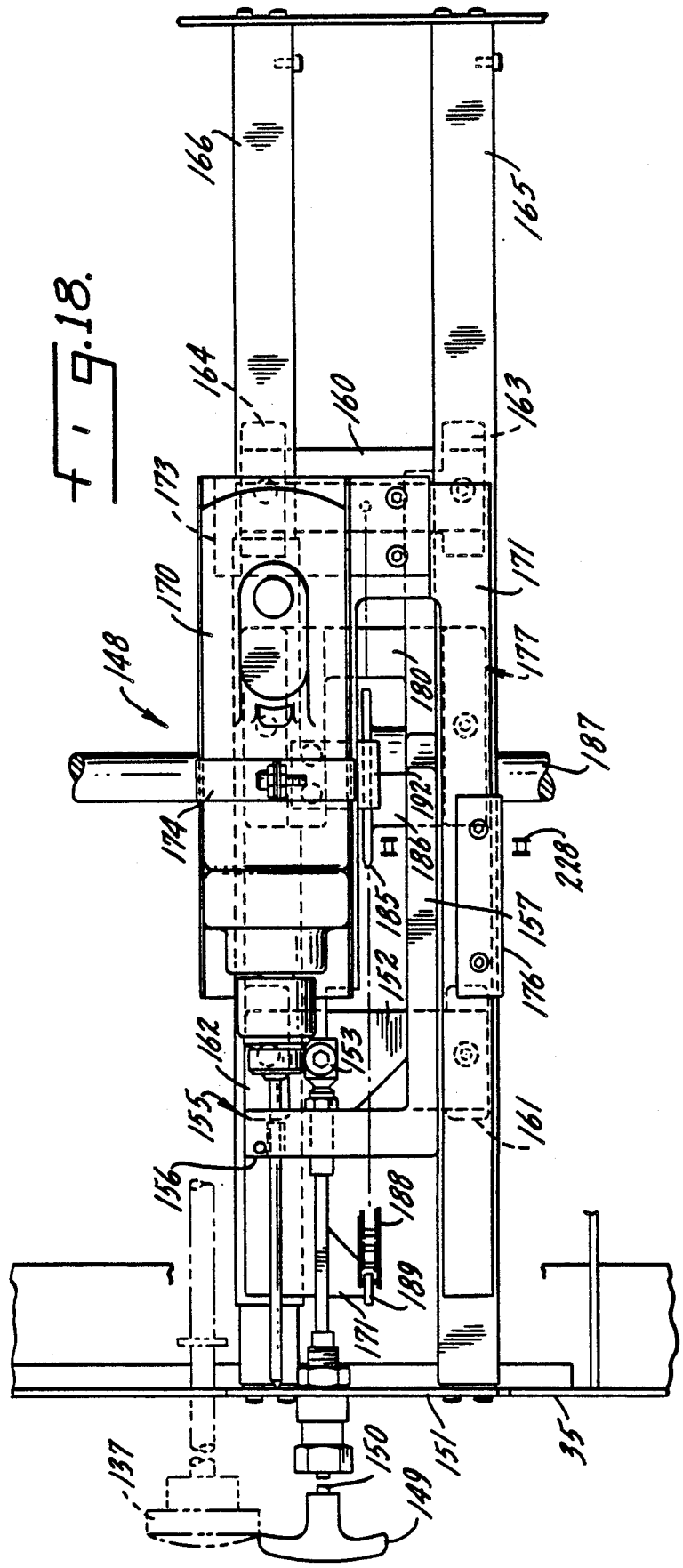

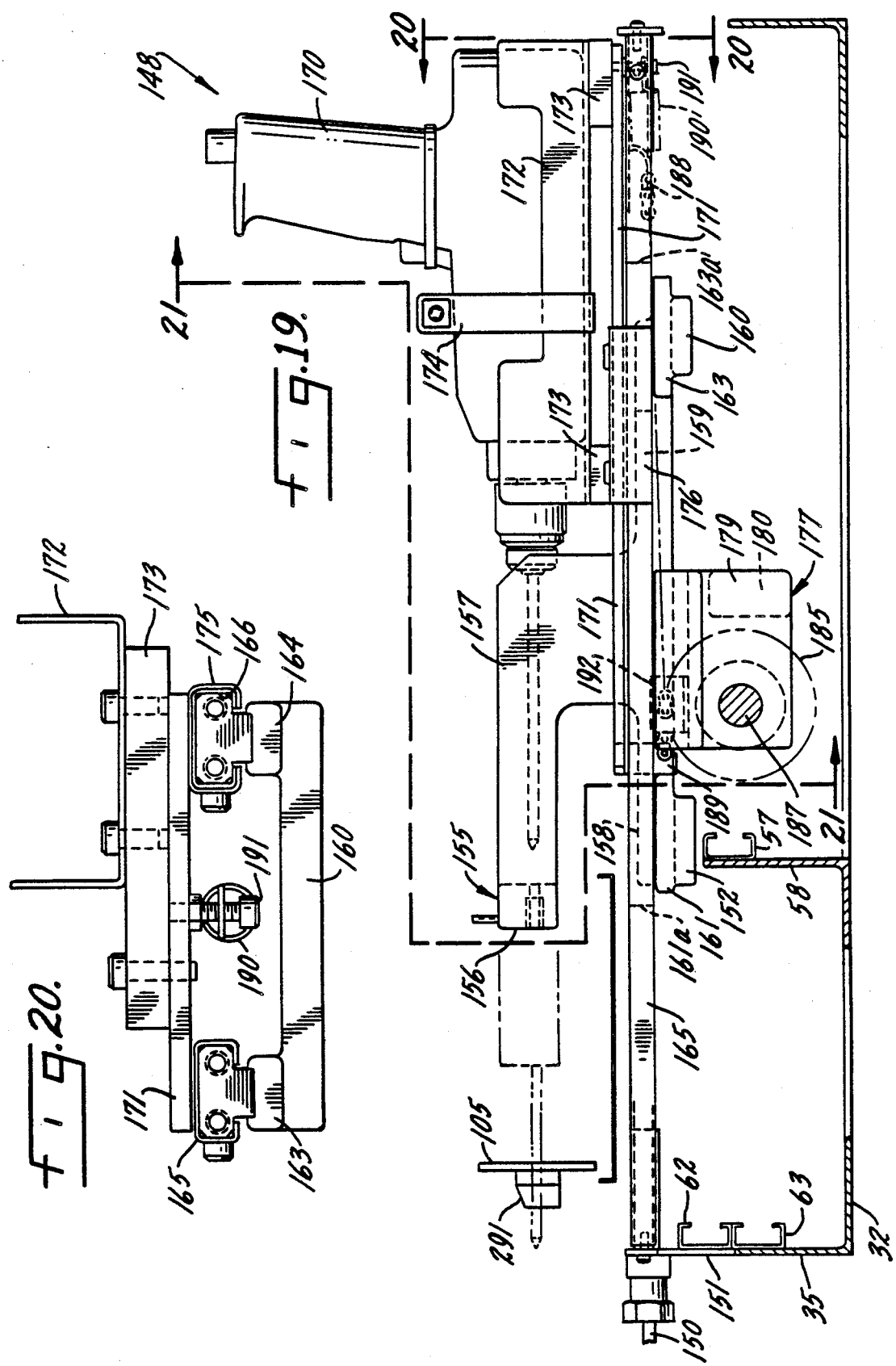

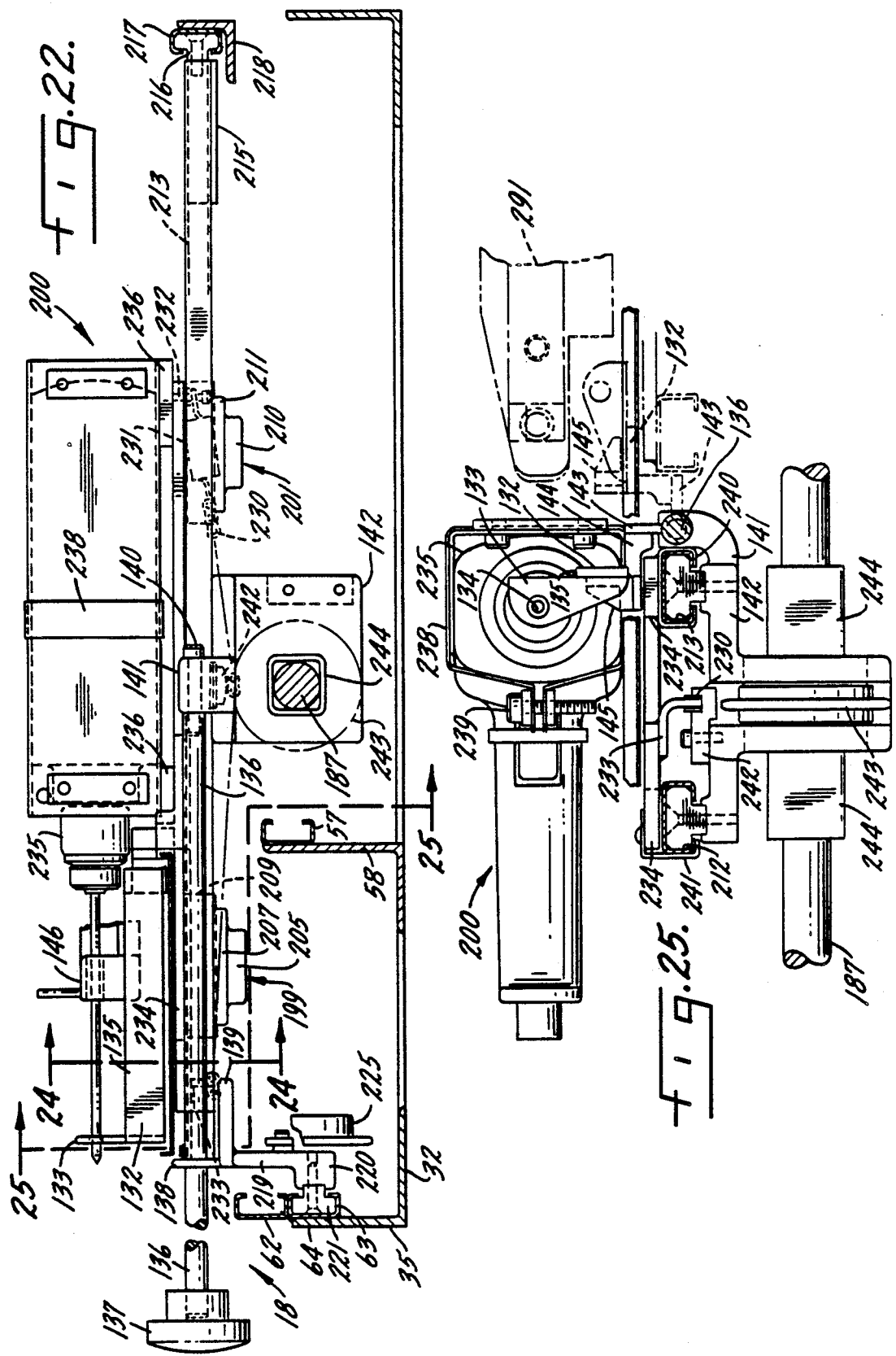

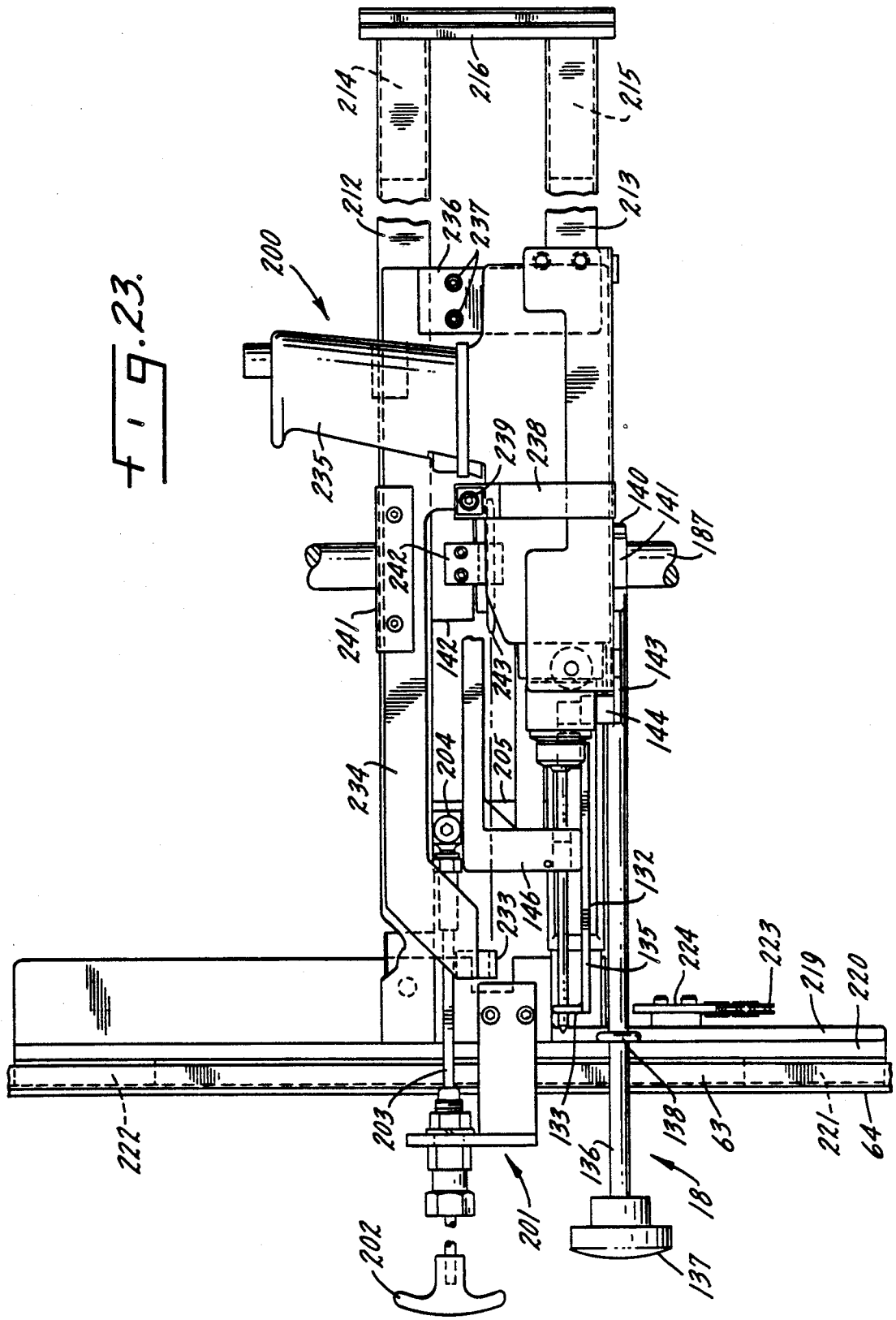

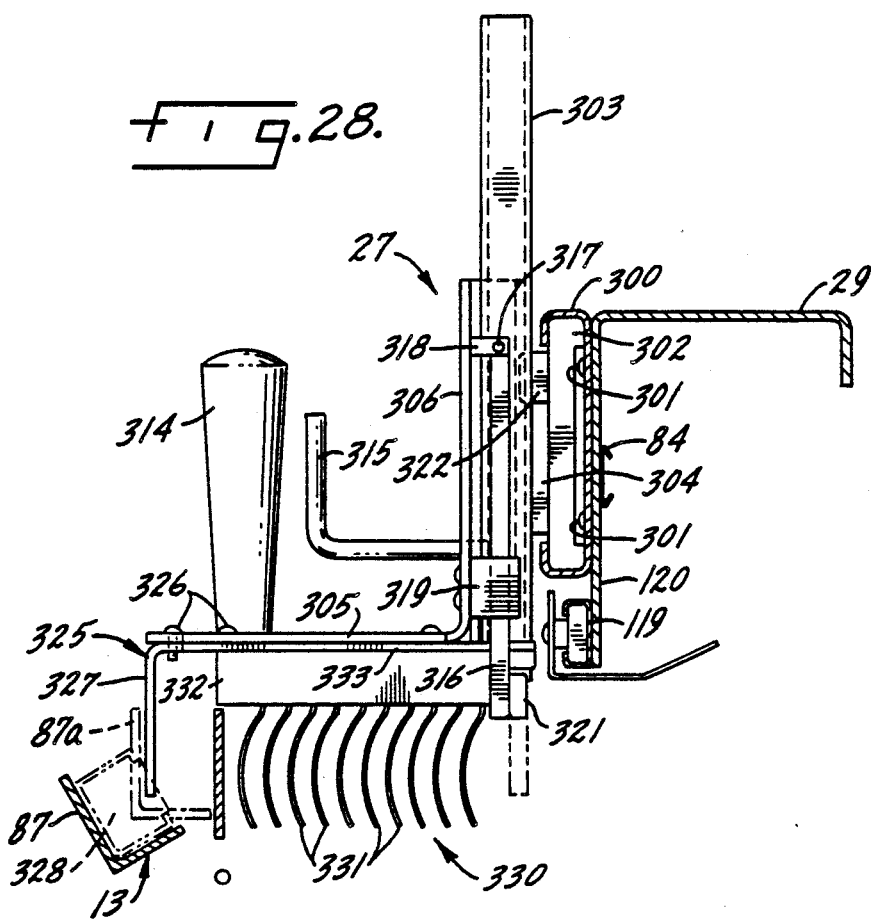
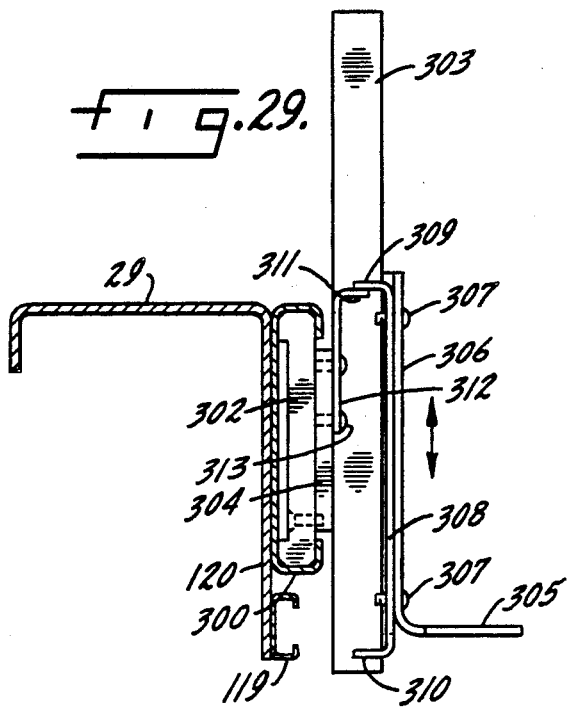
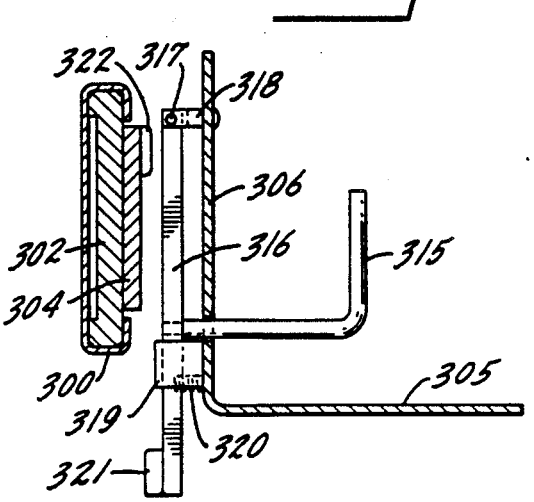

METHOD AND APPARATUS OF INFINITELY SIZING A MINI BLIND

FIELD OF THE INVENTION

This invention relates to a method and apparatus for sizing a slat window blind to an exact width at the point of purchase using the level of operator skill typically found in retail establishments which sell such blinds. The invention is particularly adapted for use in connection with a type of blind in which a number of individual, horizontally disposed slats are spaced vertically apart from one another along flexible lines, often referred to as ladder cords, and which have a flat or slightly curved cross-sectional configuration. Often such slats are approximately one inch in width and frequently the term "mini blind" has been applied to this type of article.

BACKGROUND OF THE INVENTION

One type of blind which has enjoyed substantial, and increasing, commercial acceptance in recent years is made of a plurality of metal or vinyl slats, usually about an inch in width and often slightly curved, which are vertically suspended, one above the other, on ladders which are comprised of a plurality of links and rungs which extend between and are connected to vertical side frame members. By appropriate hand pressure applied to ladder cords associated with the ladders and a tilting mechanism, it is possible to raise and lower the mini blind and to change the angle of tilt of the individual slats to accommodate the angle of incidence of the sun or for purposes of privacy or other reasons. Although standard widths which are designed to fit properly in standard width windows are available, a large percentage of such blinds must be made to measure in the sense that the window size is not of a standard width, and hence the so-called standard width blinds are either too narrow or too wide for the window in a horizontal direction. If the blind is too wide, it is inoperative for its intended purpose, which is to fit flush within the window frame opening. If the blind is too narrow, it is aesthetically unpleasing to the eye and poorly functional in that light may enter the room at the edges. At this writing, the provision of a mini blind for a non-standard width window frame is a costly and lengthy process which is often accompanied by substantial inconvenience to the home dweller who seeks to install such a blind in his home.

Typically, in order to obtain such a properly sized blind (hereafter, sometimes called a "customized" blind), the home dweller must visit a specialty blind store which offers blind customizing services, and select a blind of the proper color and length, sometimes referred to as the "drop" or height. Such blinds come in a few stock widths and, consequently, a width is selected which is slightly wider than the required width. If the stock size, which is just slightly wider than the required width, is unavailable, the next largest blind must be selected, thereby adding to the cost.

Following the selection process at the specialty store, or at a specialty department within a larger store, an appointment is made and store personnel visit the home of the purchaser and take exact measurements of the width of the window frame.

Thereafter the store personnel who took the measurements returns to the store. The blind is thereafter sized at a convenient time—which may be a considerable time after the measurements are taken in the home. Many times, other personnel do the actual customizing, as when the retail store sends the order to a factory or other central location which services a number of retail establishments, and hence the possibility of error, because of the participation of multiple people, increases.

There is no standard or even widely used procedure or equipment for performing the sizing task, and many of the people which are involved in sizing blinds have a rather high level of operator skill. Such skilled personnel are frequently both difficult to find by the retail and sizing establishment, which, as mentioned above, may be two different businesses, and difficult to retain in employment.

After sizing, the home dweller is almost invariably contacted to arrange a convenient time for the store personnel to obtain entrance to the home to install the blind. Thereafter, a second visit is made to the home at which time store personnel installs the previously customized blind. Sometimes, of course, the blind may be shipped directly from the sizing establishment to the purchaser.

If the customer has not previously paid for the blind and, in most instances, only a portion of the price, at most, will have been advanced by the purchaser, the purchaser is thereafter billed for the outstanding balance. The retail merchant thereby assumes the risk of delayed payment or a bad debt.

The cost to the consumer of the current mode of merchandising mini blinds can be illustrated as follows.

If, for example, a thirty-seven inch blind is required by the home dweller, the cost of the blind and labor as above described, at the time of this writing, including visitation to the home, can range from $100 to $200. Had the window required only a thirty-six inch wide blind, the home dweller might have been able to buy one of the standard stock sizes which can often be purchased, on a special, loss leader sale basis, for as low as approximately $8 on up to $20. In other words, the extra inch of blind width required to properly fit the thirty-seven inch window may cost the home dweller between about $90 to $190 more than a stock size blind of almost the same width costs.

It is thus apparent that there has been lacking a means for providing a mini blind of non-standard size (which is believed to represent the great majority of possible mini blind applications) at a reasonable cost and in a convenient manner.

SUMMARY OF THE INVENTION

An important object of this invention is to provide a method by which a mini blind may be sized to an exact width at the point of purchase using level of operator skill typically found in retail establishments which offer this general type of merchandise.

Another important object of this invention is to provide a machine by which a mini blind may be sized to an exact width at the point of purchase using the level of operator skill typically found in retail establishments which offer this general type of merchandise.

A further object of the invention is to provide both a method and apparatus for sizing mini blinds which, after minimal operator familiarity, is sufficiently quick that the customer is able to take the customized mini blind home after a wait of only a few minutes at the place of purchase.

Yet a further object is to provide a method and machine for customizing mini blinds which is so simple and foolproof that mis-cuts due to lengthy time lapses between measuring and sizing, or the use of multiple service personnel, is substantially eliminated.

Another object is to provide a method and machine for customizing mini blinds which lowers the cost of such desirable products to the public so dramatically that the ability to equip windows with such products is brought within the reach of literally millions of formerly ineligible potential purchasers.

Yet another object is to provide a method and machine for customizing mini blinds which makes possible the offering of such desirable products through literally thousands of retail establishments which formerly could not efficiently and/or economically offer such products to the consuming public.

A further object is to provide a method and machine of customizing mini blinds which virtually or entirely eliminates the risk and nuisance of credit problems which are inherent in current modes of merchandising mini blinds in which staggered payments are utilized.

Yet a further object of the invention is to provide a method and machine for customizing such mini blinds which requires only minimal variances in the design of such mini blinds currently on the market so that blind manufacturers can, with only modest effort, provide mini blinds suitable for customizing in accordance with this invention.

Other objects and advantages of the invention will become apparent from an understanding of the following description of a current specific embodiment and variations thereof.

BRIEF DESCRIPTION OF THE DRAWING

The invention is illustrated more or less diagrammatically in the accompanying drawing wherein:

FIG. 1 is a perspective of the machine of the present invention shown in an at rest, starting position without a mini blind in place for customizing;

FIG. 2, which is comprised of sections 2A, 2B and 2C, is a front elevation of the machine of FIG. 1 with parts broken away and others omitted for clarity;

FIG. 3, which is composed of Sections 3A, 3B and 3C, is a top plan view of the machine of FIG. 1 with parts broken away and others omitted for clarity;

FIG. 4 is a partial section view taken substantially along the line 4—4 of FIG. 2A with parts omitted for clarity;

FIG. 5 is a partial section view taken substantially along the line 5—5 of FIG. 2B with parts omitted for clarity;

FIG. 6 is a section view taken substantially along the line 6—6 of FIG. 3C;

FIG. 7 is a section on line 7—7 of FIG. 2C showing the gearing assembly;

FIG. 8 is a section on line 8—8 of FIG. 2A, showing the gear for extending and retracting the tape;

FIG. 9 is a top plan view of the cutter;

FIG. 10 is a front elevation of the cutter;

FIG. 11 is a section on line 11—11 of FIG. 6, showing details of the cutter;

FIGS. 12-14 are details of the head rail support and trigger;

FIGS. 15-16 are details of the blind carrier and tiltor bar cutter;

FIG. 17 is a detail section taken on line 17—17 of FIG. 15.

FIG. 18 is a top plan of the fixed drill and clamp in its forward or drill position;

FIG. 19 is a side elevation of the fixed drill in a at rest or rear position;

FIG. 20 is a section on line 20—20 of FIG. 19 showing details of the moving rail, enlarged;

FIG. 22 is a side elevation of the movable drill, its associated clamp and the center support;

FIG. 23 is a top plan of FIG. 22;

FIG. 25 is a section on line 25—25 of FIG. 22, showing the movable drill drive and center support;

FIG. 28 is a section on line 28—28 of FIG. 26, showing the rake trigger up and down slide, and longitudinal slide;

FIG. 29 is a section on line 29—29 of FIG. 26, showing the down stop for the rake;

FIG. 30 is a section on line 30—30 of FIG. 27, showing the rake assembly trigger;

DESCRIPTION OF A SPECIFIC EMBODIMENT

Figure 21:
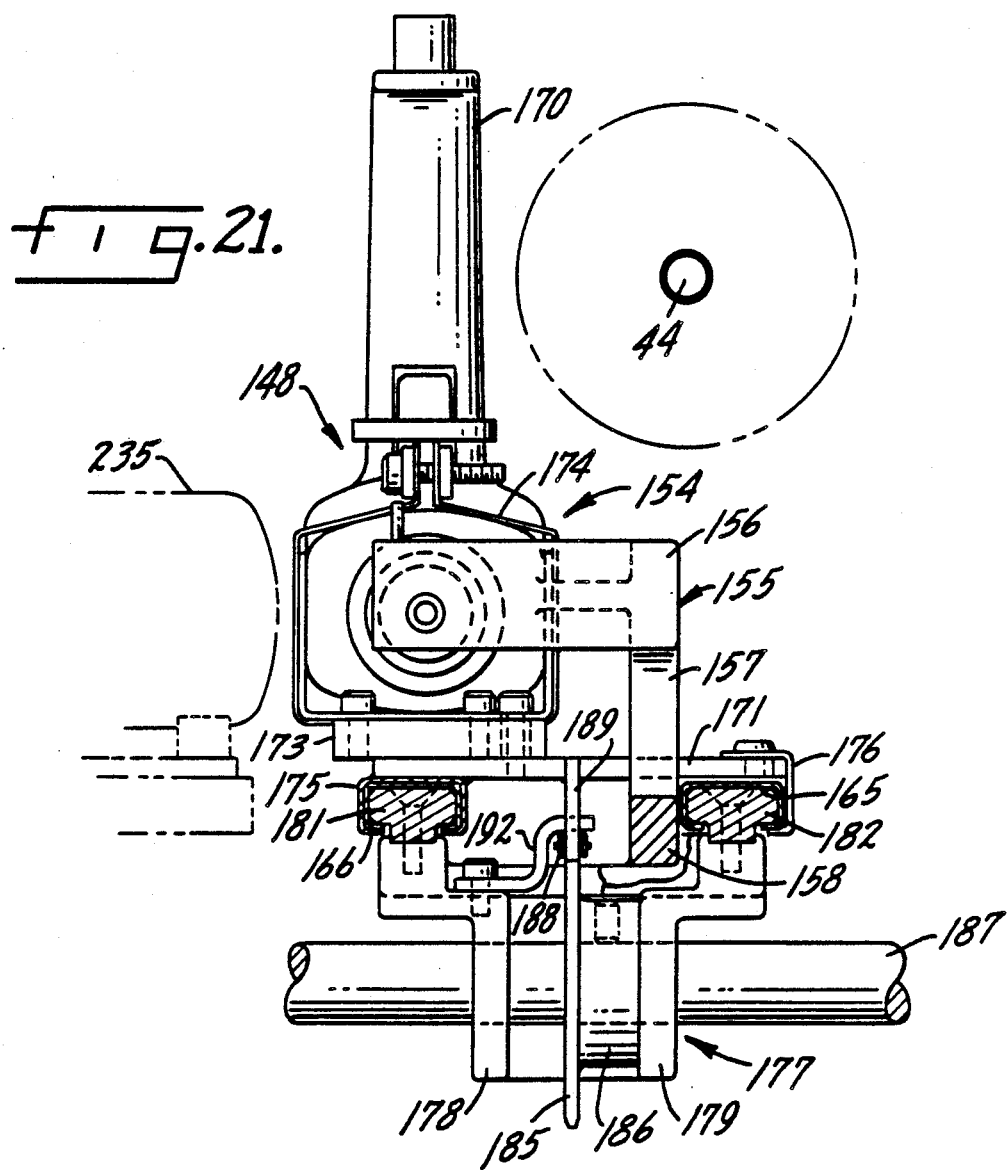
FIG. 21 is a section on line 21—21 of FIG. 19 showing details of the fixed drill gear drive.

Like reference numerals will be used to refer to like parts from Figure to Figure throughout the following description of the drawing.

For ease of describing and understanding the invention, it will be described as applied to the sizing of a mini blind of the general type and description illustrated and described in co-pending patent application Ser. No. 35,457 which is assigned to the assignee of this application. Specifically, it will be assumed that five basic sizes of blinds must be sized, said sizes, insofar as relevant to an understanding of the invention, being conventional stocked widths. Purely by way of example, it may be assumed that the range of sizes of a blind which can be formed from a basic size is up to 10-12 inches less than the stock width of the blind. For purposes of illustration it will be assumed that the ranges are (1) 15-25 inches (2) 23-36 inches (3) 36-48 inches (4) 48-60 inches and (5) 60-72 inches. Although all sizes have generally the same common elements, such as slats, a bottom rail, a head rail, a tiltor bar cut off mechanism, etc., there are differences from size to size, and these differences result in variations in the structure and function of the invention from size to size. In view of the foregoing, then, the invention will be described primarily in connection with sizing the smallest basic size; i.e.: the 15-25 inch size, since the operation is simply, yet fully, illustrative of the structure and method of operation of the invention.

Referring first to FIG. 1, the apparatus of this invention, the operation of which also illustrates the method claimed herein, is indicated generally at 10. A hand crank assembly is indicated generally at 11, a mini blind carrier assembly generally at 12, a head rail assembly generally at 13, a head rail assembly trigger mechanism at 14, a cut-off blade assembly generally at 15, a view finder at 17, a center support assembly generally at 18, a tiltor bar cut off assembly generally at 19, a fixed drill clamp assembly generally at 20, a key switch assembly generally at 21, a pump engaging assembly generally at 22, a pump operating handle at 23, a stationary drill assembly generally at 25, a moveable drill assembly generally at 26, and a ladder rake assembly generally at 27. A housing is shown at 28, the housing including a top hood 29 and a shroud 30.

Referring now to FIGS. 2 and 3 and, where necessary, other Figures as noted, the machine frame includes a base plate 32, left and right end plates 33, 34, lower front plate 35, upper front plate 36, and rear plate 37.

Referring now particularly to FIGS. 2C, 3C and 7, the hand crank assembly 11 includes a crank shaft 38 mounted in upper front plate 36 and rear plate 37 which carries a crank wheel 39 having a crank handle 40. Shaft 38 carries a crank drive sprocket 41 at its inner end which drives power input sprocket 42 through crank drive chain 43.

The power input sprocket 42 is carried by master drive shaft 44, see FIG. 7, whose inner end is supported by rear plate 37 and whose outer end is supported by upper front plate 36. Sprocket 42 carries tiltor sprocket 46 which, in turn, drives tiltor bar carriage chain 47 which passes around tiltor bar idler sprocket 48, see particularly FIGS. 2A and 3A.

The tiltor bar cutter assembly carriage and its mode of operation is illustrated best in FIGS. 2A, 3A, 7 and 15-17. Referring first to FIGS. 15 and 16, a generally inverted U-shaped mini blind carrier base plate is indicated generally at 50. The base plate 50 includes a flat horizontal support section 51, a vertical rear wall 52 and a generally downwardly extending vertical front wall 53. Rear wall 52 carries a pair of back slides 54, 55, each of which is secured as by bolts 56, see FIG. 16, to the rear wall. The back slides are generally T-shaped in cross section with the head, or cross bar of the T being slidable in a generally C-shaped back guide 57. Back tiltor bar guide 57 in turn is secured to the vertical flange 58 (see FIG. 7) of frame member 36. The lower end of the vertical front member 53, see FIG. 15, carries a mounting bracket 59 which in turn carries a pair of front slides 60, 61 which are received and slidable in a generally C-shaped front tiltor bar guide 62. The front guide 62 is disposed above and secured to the front moving drill guide 63 which in turn is welded or otherwise suitably secured to the vertical leg 64 of lower front plate 35.

A support bracket 65 is secured, at its lower end, as by fasteners 66, to the rear wall 52 of base plate 50 and, at its upper end, to tiltor bar drive chain 47. It will thus be seen that as sprocket 46 rotates counter clockwise and clockwise, the carrier base plate 50 will slide to the left and right respectively along the horizontal path defined by front and rear tiltor bar guideways 62 and 57.

Referring now specifically to FIGS. 15-17, a pair of parallel rectangular plates are shown at 67, 68, the plates being welded or otherwise suitably secured to the upper support section 51 of carrier base plate 50. The plates serve as a mounting frame for the cut-off mechanism indicated in FIG. 17. Right plate 68 in addition functions as an abutment plate for the left end of a mini blind when the blind is snugged against it to ensure that all slats will be cut to a uniform width. A generally L-shaped back wall stop plate is indicated at 69, the back plate functioning as a back stop against which the compressed lower end of a mini blind to be shortened is positioned during sizing. The cut-off mechanism in FIG. 17 includes a circular stationary anvil 70 which is fixed to right plate 68 by set screw 71 or other suitable means. The right side of the anvil may be slightly recessed as at 72 to facilitate the insertion of the end of a tiltor bar which is to be cut off. A rotatable sleeve is indicated at 73, and an elongated angled tiltor bar handle at 74, the left end of the handle as viewed in FIG. 15 being welded or otherwise suitably secured to the sleeve 73. From FIGS. 15, 16 and 17 it will be noted that the eccentrically located bore through the sleeve 73 is fitted with a hardened bushing. As a result, when the handle 74 is rotated in a counter-clockwise direction, that portion of the tiltor bar to the left of the vertical parting line between the left side of right plate 68 and the right side of sleeve 73 will be sheared.

The tiltor bar chain 47 performs the additional function of paying out and making possible the retraction of a flexible tape measure which the operator uses to size the mini blind to the exact width specified by a customer.

A flexible, preferably metal, reel tape housing is indicated at 76 in FIGS. 2C and 3C, and a flexible metal tape at 77. A tape bracket 78 which is secured to upper front plate 36 by bolts 79 supports the tape housing. The tape 77 is guided against the rear face of upper front plate 36 by a deflecting bracket 80 which forces the tape into sliding engagement with the rear surface of upper front plate 36. The tape 77 passes the viewfinder 17 which is essentially an aperture in upper front plate 36 so located as to be easily seen by the operator during sizing.

The left end of the tape 77 is fastened to a tape bracket 81, see FIG. 2A, which in turn is secured to a bracket base 83, which in turn is adjustably mounted to support bracket 65. A tape holder or guide is indicated at 84, see FIG. 3A, the tape holder being secured to the front, downwardly depending wall portion 36 of top hood 29. It will be understood that by suitable arrangement of the flexible tape with respect to the position of the carrier assembly 12, the right side of plate 68 will always be located at the proper distance from the cut-off blade assembly 15 so as to yield a mini blind of the exact size specified by the customer and shown in viewfinder 17.

The head rail assembly 13 is illustrated best in FIGS. 1, 2A, 3A, and 28 to which reference is now made. The primary functions of the head rail angle assembly are to swing the head rail away from the slats to enable the pull cord of the mini blind to be disassembled from the head rail preparatory to later threading, and to allow movement of bearing block baskets into position while allowing access for lift cord threading.

The head rail assembly consists essentially of an elongated L-shaped head rail bar 87, see FIGS. 2A, 3A, 6, 12, 14 and 28, which is pivoted, at its right end, at 88, see FIGS. 6, 12 and 13 and, at its left end, about a head rail pivot 89, see FIG. 12 and 14, carried by head rail bracket 90 which in turn supports the head rail 87, all as best shown in FIGS. 2A, 12 and 14. Preferably the front, upwardly extending wall of the head rail carries a series of indicators of the basic sizes (i.e.: 25, 36, 48, 60, 72) of the basic widths to enable the operator to quickly crank in one motion the mini blind carrier to the correct starting position.

The head rail is swung from its upward, clamping position, see 87A in FIG. 28, to its lowered clear position, see 87 in FIG. 28, by the trigger mechanism best shown in FIGS. 12 and 13. The trigger mechanism includes a generally C-shaped end plate 92 which is mounted to pivot at 88, see FIG. 6.

Plate 92 is secured to head rail bar 87 by screws 93 which clamp the end plate to a flange 94 which extends downwardly from the extreme right end of head rail bar 87. A trigger plate 95 is secured to end plate 92 by screws 96. The trigger plate has a threaded aperture 97 which threadably receives the handle screw 98 which projects from the inner end of handle 99. A pair of ears 100, 101 project upwardly from the top of trigger plate 95 and are apertured to receive a pivot shaft 102 about which latch 103 pivots. As best seen in FIG. 13, the right or inner end of latch 103 has an inclined surface 104 which is dimensioned and located to ride up and over latch plate 105, see FIG. 9, such that tooth 106, when it bears against the inside surface of latch plate 105, will prevent counter-clockwise movement of latch 103. However, a slight downward push on the left end of latch 103 is sufficient to rock tooth 106 up and out of engagement with latch plate 105 and permit the head rail 87 to swing to the position indicated at 87 in FIG. 28. Handle 99 facilitates both latching and unlatching movement by the operator.

A ladder guide system is illustrated primarily in FIGS. 1, 2, 3, 4, 5, 7 and 8. The ladder guide system is a locating system for the placement of the ladders following the cutting and drilling operations. It will be understood that a mini blind, as it is taken from the container preparatory to cutting, may have only one ladder, for example the left most ladder, fixed in place with respect to the slats. The center and right ladders, or more in the case of a wide mini blind, may be located near the left side of the slats, but loosely carried by the slats so that the entire ladder or ladders can be slid along the slats to their final locations after the sizing operation. If the final location is one in which a hole has been drilled for the reception of a pull cord, it is essential that the operator have a very clear indication of where the ladder should be moved to, and then further adjusted, as will be explained hereinafter. Even for those ladder locations which are not associated with a drilled hole, it is essential that the operator have guidance as to where the final placement of a ladder should be so that a balanced, aesthetically pleasing appearance to the eye is presented by the final product.

Referring first to FIGS. 3C and 7, it will be noted that rotation of power shaft 44 by crank 40 will rotate left ladder guide drive sprocket 108 and right ladder guide drive sprocket 109.

Left ladder guide drive sprocket 108 drives the left ladder guide drive chain 110 which passes over the left ladder guide idler sprocket 111, see FIG. 2A. A link bracket 112, see FIG. 4, connects the left ladder guide, indicated generally at 113, to chain 110 by screw means 114. The left ladder guide includes a front, vertical portion 115, see FIGS. 2A and 4, which is visible to the operator, and which may carry an appropriate legend such as "Ladder Guide 2". A lower horizontal section 116 and a rear, vertical section 117, to which the screw means 114 are secured to connect the ladder guide to the drive chain 110, complete the ladder guide. A generally T-shaped ladder slide is indicated at 118, the slide being slidable in ladder guide channel 119 which is welded or otherwise suitably secured to the downwardly extending portion 120 of top hood 29, see FIGS. 4 and 8.

The right ladder guide is indicated generally at 121 in FIGS. 1, 2B and 5. Right ladder guide drive sprocket 109 drives the right ladder guide drive chain 122 which in turn passes over right ladder guide idler sprocket 123, see FIGS. 2B and 3B. A link bracket 124, see FIG. 5, connects the right ladder guide 121 to chain 122 by screw means 125. The right ladder guide includes a front, vertical portion 126, see FIGS. 2B and 5, which is visible to the operator, and may carry an appropriate legend, such as "Ladder Guide 1", a lower, generally horizontal section 127 and a rear vertical section 128 to which the screw means 125 are secured connect the right ladder guide to drive chain 122. A generally T-shaped slide in ladder guide channel 119 is indicated at 129, the slide being slidable in ladder guide channel 119 which is welded or otherwise suitably secured to the downwardly extending portion 120 of top hood 29, see FIGS. 5 and 7.

It will be noted that because of the difference in the size of sprockets 108 and 109, left ladder guide 113 will move a greater distance than right ladder guide 121 for a single rotation of power shaft 44, the exact relationship between the movements of the two ladder guides being determined by the number of teeth on the two sprocket wheels.

The center support 18 is used to support the mid-section of a larger mini blind, such as a 48" or larger blind, and is illustrated best in FIGS. 1, and 22-25. The center support includes a flat rest plate 132, see FIG. 22, having a front abutment plate 133 extending at right angles therefrom at its outer edge; that is, the edge closest to the operator. As best seen in FIG. 25, the abutment plate 133 has an aperture 134 which is sized large enough to enable a drill bit to easily pass through it at the conclusion of the extension stroke when the movable drill is used. It will be understood that in use the mini blind being sized rests on the upper edge 135 of plate 132, see FIG. 22.

The center support is swung from its elevated, operative solid line position of FIG. 25 to its out of the way, inoperative, dotted line position of FIG. 25 by center support shaft 136 which includes round knob 137 of FIGS. 22 and 23. The left or outer end of shaft 136 is supported in bracket 138 which projects upwardly from frame member 139. The inner recessed end of the shaft is drilled and threaded to receive a threaded bolt 140. The bolt 140 is received within and rotates with respect to a support bracket 141 which is integral with the right side 142 of the moving drill reciprocating system. An ear 143, see FIG. 25, is welded to shaft 136 and carries a generally L-shaped bracket 144. Bracket 144 in turn is welded to end plate 145 which in turn is welded to center support rest plate 132. Thus, as knob 137 is rotated by hand, the center support rest plate 132 will move into the solid line, actuated position of FIG. 25 from the deactivated dotted line position of FIG. 25.

Figure 24:
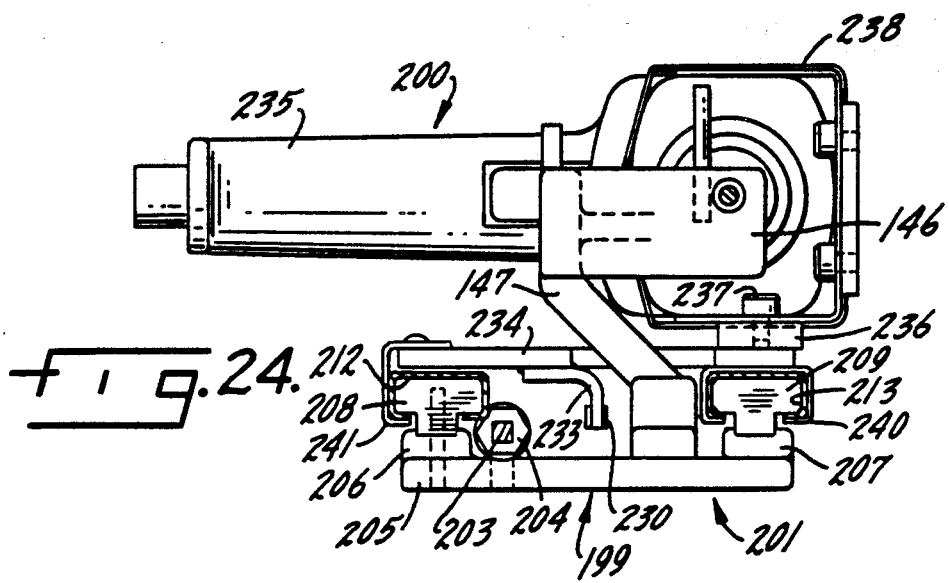
FIG. 24 is a section on line 24—24 of FIG. 22, showing the movable drill rail system.

A rear abutment plate 146 having an aperture therein larger than the drill bit of the fixed drill assembly, see FIG. 24, is integral with a support arm 147 which extends upwardly from the support assembly for the fixed drill assembly as will be described hereinafter. It will be understood that the bottom rail of the collapsed mini blind bears against the rear abutment plate 146 when the moving drill is used.

The clamping system for maintaining the mini blind fixed while the cutting and drilling operations take place and the fixed drill assembly are illustrated best in FIGS. 1, 10 and 18-21.

The fixed drill assembly is indicated generally at 148 in FIGS. 18-21. Since the fixed drill clamping assembly 20 and the fixed drill assembly 148 operate in conjunction with one another, they will be described together. It should be noted that the word "fixed" when used in conjunction with the fixed drill assembly means that the drill does not move in the direction of the longitudinal dimension of the head rail 87. However, the drill does reciprocate in an extending (i.e.: drilling) and retracting motion which is perpendicular to the longitudinal dimension of the head rail 87.

The fixed drill clamp assembly 20 includes a clamp handle 149 which reciprocates clamp shaft 150 which passes through an aperture in frame member 151. The inner end of the clamp shaft 150 is affixed to a lower frame member 152 by a bolt 153. The cross frame member 152 is part of the clamp and drill frame indicated at 154.

The clamp and drill frame 154 includes the rear clamp face member 155 whose front face 156 is arranged to press against a mini blind to be sized, and specifically the bottom rail of a mini blind. Clamp face member 155 terminates at its right end as viewed in FIG. 1 in the support 157 which has forward and rearward extending foot portions 158 and 159. Foot portions 158, 159 are integral with cross frame members 152, 160 at their front and rear ends respectively on the right side of the assembly as viewed in FIGS. 18 and 21. Cross frame members 152, 160 include integral pairs of slide supports 161, 162 on the front and 163, 164 on the rear, see FIG. 18. Slides 161A, 162A, 163A, and 164A are secured to the slide supports 161, 164 by any suitable means. Slides 161A-164A slide within slideways 165, 166 which are mounted to the front and rear frame support. Hence, when the operator pulls the handle 149, the press face 156 will press against the bottom rail of a collapsed mini blind which is positioned for sizing.

Drill assembly 148 includes a drill, indicated generally at 170, which is secured to base plate 171, see FIG. 20, by a cradle 172 which in turn is secured to spacer block 173 by any suitable means. The drill 170 may be held in the cradle by strap 174.

Base plate 171 is fast with a slide 175, see FIG. 20, which partially encircles slide 166 to permit the drill 170 to reciprocate independently of the clamp support. The right side of the drill base plate 171 (as viewed in FIGS. 21) carries a slide clamp 176 which stabilizes the drill assembly.

In FIG. 21 a sprocket support is indicated at 177, the sprocket support consisting of a pair of walls 178, 179 which are spaced, at their rear ends, by spacer 180, see FIG. 19. The upper edge of walls 178, 179 are offset and terminate in upturned edges which carry slide elements 181, 182 which are received within slides 165, 166.

Referring again to FIG. 21, sprocket 185 includes a hub 186 which is fast with shaft 187. The sprocket 185 is driven by a drill drive chain 188 which is connected, at its front, to a down turned ear 189, see FIG. 18, which is part of drill frame 171, and, at its rear, to a tension spring 190, see FIG. 20, via a bolt 191, see FIG. 20, which projects downward from drill frame 171. The chain 188 is held in contact with sprocket 185 by a chain keeper clip 192 which is fixed to sprocket support 177.

The drill assembly is reciprocated by sprocket 185 and shaft 187, the shaft being driven by means described hereinafter.

It will thus be seen that when the drill assembly 148 is pulled against a mini blind, the head rail abuts a forward stop which is illustrated in FIG. 10, the construction and positioning of which will be explained hereinafter.

The clamp and movable drill assembly 200 is illustrated in the FIGS. 22-25. It's construction and operation is similar to that of fixed drill assembly 148 but varies in some particulars.

The movable drill assembly is supported by a carriage indicated generally at 201; see FIGS. 22 and 23 particularly.

The carriage assembly 201 includes a handle 202 which reciprocates a square clamp shaft 203, see FIGS. 23 and 24, which terminates in mounting nut 204 which in turn is affixed to lower front cross frame member 205 of the carriage frame, which frame is indicated generally at 199 as shown best in FIG. 22. The cross frame of which lower front cross frame member 205 forms a part includes slide pads 206, 207, see FIG. 24, which carry slides 208, 209 and lower rear cross frame members indicated at 210. It will be understood that lower rear cross frame member 210 is secured to a pair of rear slides identical to slides 208, 209, said rear slides being mounted on slide pads, one of which is indicated at 211. The four slides reciprocate in slideways 212 and 213. The rear ends of slides 212, 213 are received over slide supports 214, 215 which are fixed to rear center drill guide 216, shown best in FIGS. 22 and 23. It will be noted that the slide supports and rear center drill guide form a rigid, generally U-shaped structure. The rear center drill guide 216 slides within a longitudinal slide 217 which is mounted to frame member 218, shown best in FIGS. 3C and 22.

The front ends of slides 212, 213 receive projections from a rigid front support frame which includes downwardly extending elevation compensating member 219 which carries the mounting pad 220 which in turn has mounted pair of front drill slides 221 and 222 which slide longitudinally within slideway 63 which is fast to a frame member.

The carriage frame 199 is moved longitudinally by a chain 223, see FIG. 23, which is connected by chain connector 224 to the frame member 219. It will be noted that the chain 223 is reeled in and payed out by rotation of front jack shaft sprocket 225, see FIGS. 7 and 22. The sprocket 225 is fast with jack shaft 226 which is fast with rear jack shaft sprocket 227. Sprocket 227 is driven by chain 228 which engages the moving drill sprocket 229 which in turn is carried on shaft 44.

Transverse reciprocation of drill assembly 200 is provided by chain 230 which is connected, at its rear end, to tension spring 231 which in turn is anchored to the underside of the drill mounting base plate 234 by bolt 232. The front end of the chain is anchored at bracket 233 which is fast with the underside of the drill mounting base plate 234, see FIG. 25.

Drill 235 is secured to drill mounting base plate 234 by a spacer 236 and bolt means 237, the drill 235 being gripped by pinch bracket 238 which includes clamping means 239, see FIG. 24.

The right edge of drill mounting base plate 234 carries master slide 240 which encircles and slides with respect to slideway 213. The left edge of drill mounting base plate 234 carries retainer clip 241 which encircles and slides with respect to slideway 212. A chain retainer clip 242 is mounted on sprocket mounting 142 to keep the chain 230 in engagement with sprocket 243. It will thus be seen that as sprocket 243 and its integral square hub 244 rotates about the fixed axis of shaft 187, the chain 230 and movable drill assembly 200 to which it is secured will reciprocate transversely with respect to the longitudinal dimension of the head rail.

The cut off mechanism indicated in FIGS. 1, 2C and 3C is best illustrated in detail in FIGS. 6, 9, 10 and 11.

The cut off mechanism is indicated generally at 250. It includes a pump engage lever 251, see FIGS. 6 and 9, which is readily accessible to the operator at the front of the machine and passes through an aperture in the front frame member of the machine. The rear end of pump engage lever 251 is connected to and rotates valve stem 252 which in turn operates an internal valve in pump 253 so as to engage the pump. By pumping pump lever 254, which is pivoted to the frame at 255, in a backward and forward motion, pump connecting rod 256, which is connected to the piston 257 of the pump, the pump is pressurized. As the pump is operated, ram 258 is moved to the left as viewed in FIG. 6. The ram in turn causes a block 259 carried at the outer end of the ram to actuate a cutter slide assembly 260 to which it is attached. The cutter slide assembly includes a rear push bar 261 which is bolted to the block 259. The rear push bar 261 in turn pushes on cutter carrier block 262, see FIG. 11, which in turn carries a cutter 263 which is bolted thereto at 264. A cutter indicator lever 265 is mounted to the cutter carrier block 262 by the same bolts 264. The cutter indicator lever 265 has a socket 266 formed in its front edge, the socket receiving a spring loaded aligned pin 267 which is mounted on the front frame member, see FIG. 6. The force of the compressed spring 268, when the cutting action is completed, urges the cutter indicator lever 265, and thus the cutter 263 and thus the carrier block 262 to a retracted disengaged position sufficient to allow the head rail angle to be swung out after the cutoff, the cutter slide then staying in this position to prevent the product from sliding during the positioning of the ladder cords. The cutter indicator lever is manually pushed to the full retracted position prior to positioning the next mini blind for sizing.

The cutter carrier block 262 and rear push bar 261 slide within upper and lower slideways 269, 270, as best seen in FIGS. 6 and 11.

The rear cutter bar 261, and thus the piston block 259, are returned by a return spring assembly indicated generally at 275. The return spring assembly 275 includes a T-shaped head 276 which is welded to the piston block 259. The upper and lower ends of the cross bar carry pins 277, 278 respectively which in turn mount a pair of springs 279 and 280. The two springs are secured at their inner ends to the rear frame member.

A drill drive chain is indicated at 281. The chain is connected to the lower end of the cross arm of the T-shaped bar 276 at 282. The chain passes over and around adjustable front sprocket 283 and fixed rear sprocket 284. Sprocket 284 drives the drill shaft 187. It will thus be seen that as the pump lever 254 is pumped, the cutter and drill assembly are driven forward simultaneously.

It will be noted that shaft 187, which is driven by sprocket 284, includes a square portion 285 at its left end, see FIG. 2B, and a round portion 286 at its right end. Thus, the movable drill assembly will not be activated until it is moved longitudinally away from the cut off mechanism a distance sufficient to cause square portion 285 of the shaft to engage the square hub 244, see FIG. 25, of the movable drill assembly.

Referring now particularly to FIGS. 10 and 11, an abutment plate is indicated at 287 for supporting the right end of the compressed mini blind to be sized. The abutment plate is fixed to the edge of the plate by screws 288. A slat hold down is indicated at 289, the upper edges being secured thereto by screws 290.

Plate 287 carries the drill bushing guide 291 for the fixed drill.

The ladder rake assembly is illustrated best in FIGS. 26-30 to which reference is now made. In all of these Figures the ladder rake is in its down or operative position, which is the level at which it is actuated when the ladder or ladders of a newly cut mini blind are positioned preparatory to threading the ladder cord, or cords, as the case may be.

The ladder rake assembly 27 is mounted on hood 29 as seen in FIG. 28 by fasteners 301. The assembly includes a horizontal rake channel 300 which appears in all of said Figures and, also, in FIGS. 1, 2A-C, 3A, 3C, 4, 5, 7, 8 and 15. A horizontal guide 302 is slidably received within channel 300. As seen in FIG. 28, the rear of the guide is recessed to provide clearance for the fasteners 301.

A vertical rack channel is indicated at 303. The vertical rack channel 303 is secured to horizontal guide 302 by a spacer 304 and suitable fasteners.

The ladder assembly includes a base bracket 305 which has a vertical, back plate portion 306. Back plate 306 is secured to the vertical guide by a spacer 304a. Back plate 306 is secured by fasteners 307 to a narrow vertical travel limit bracket 308 which has upper and lower inwardly projecting stops 309, 310. From FIG. 29 it will be seen that, in the actuated position, the underside of upper stop 309 rests on a lip 311 which extends outwardly from stop bracket 312 which is secured to spacer 304 by fasteners 313. It will thus be seen that the vertical movement of the base bracket 305 along vertical rack channel 303 is defined by the spacing relationship between stops 309, 310 and lip 311.

Means for moving the base bracket 305, and the accompanying ladder tines, to be later described, from an upper, retracted position to a lower, operative position includes a handle 314 secured to base bracket 305 by any suitable means. A trigger finger 315 extends through the vertical back plate 306, as shown best in FIG. 30, and is anchored in trigger rod 316 which is pivoted about trigger pivot 317 which is carried by pivot arm 318 which in turn is fast with vertical back plate 306. A U-shaped strap 319 encircles trigger rod 316. Rod 316 is biased inwardly by spring 320 which is seated in a recess in rod 316 and whose outer end abuts the rear of back plate 306. A trigger is indicated at 321 and a trigger catch at 322. From the relative positions of the parts as shown in FIG. 30 it will be noted that in order for the base bracket 306 to be moved to an upper, latched position, trigger finger 315 must be pulled outwardly against the bias of spring 320 to enable trigger 321 to be swung counter-clockwise as viewed in FIG. 30 so that the trigger may clear the trigger catch as movement occurs in a vertical direction.

When the trigger finger 315 is released, and the spring returns trigger 321 to its inward position, the bottom of trigger 321 will rest on the top of trigger catch 322.

Figure 26:
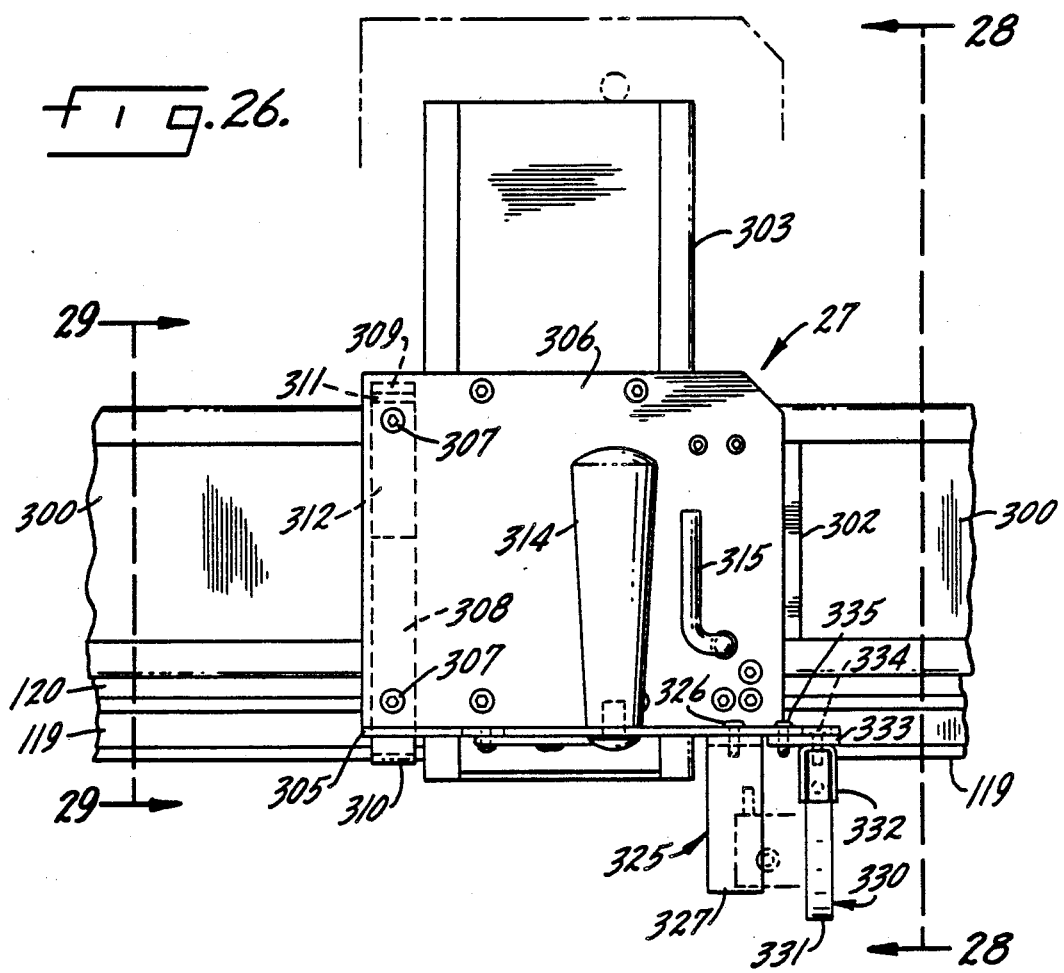
FIG. 26 is a front elevation of the rake assembly.
Figure 27:
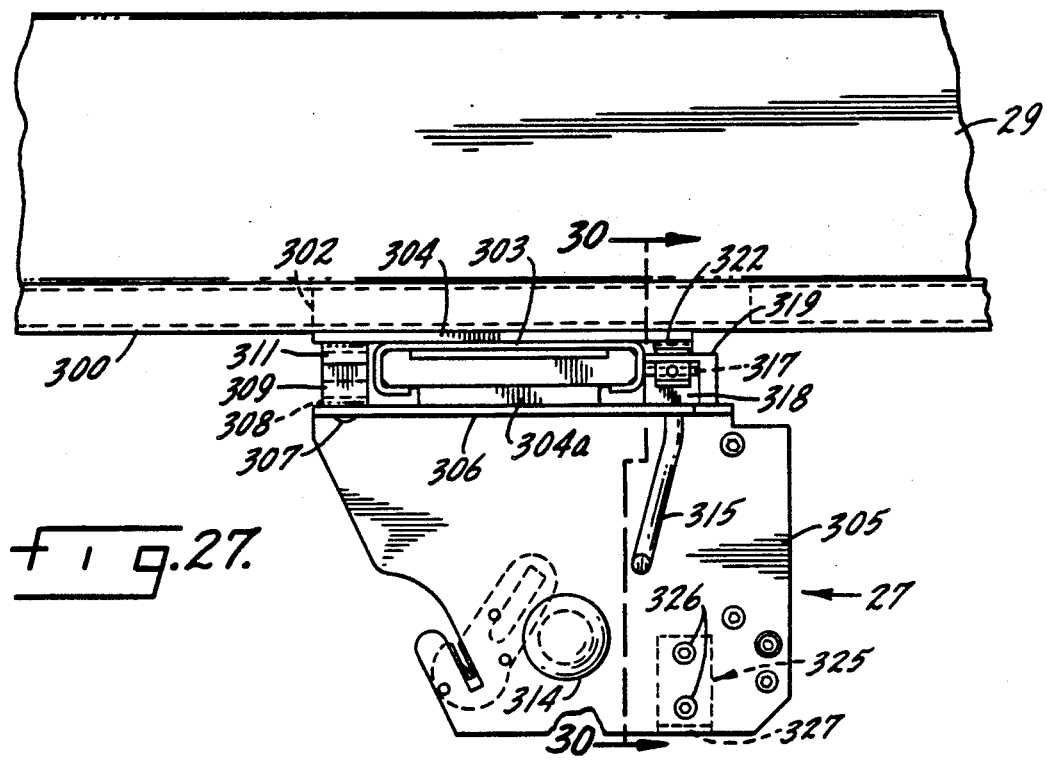
FIG. 27 is a top plan of FIG. 26.

The mechanism for moving a basket and a ladder of a mini blind to a desired final position following sizing is shown best in FIGS. 26-28.

A basket rake is indicated at 325, the rake being essentially an inverted L-shaped bracket whose upper portion is fastened to the under side of base bracket 305 by fasteners 326, and whose lower portion 327 extends downwardly a distance sufficient to make abutting contact with a basket 328 received in head rail 87 when the head rail is in the down position of FIG. 28.

A tine assembly is indicated generally at 330, said tine assembly consisting of a plurality of tines 331 which are contoured to be received between the individual slats of a sized mini blind after the mini blind has been unclamped following sizing and the individual slats loosened to receive the tines. The tines are received in a generally inverted U-shaped tine holder 332, see FIG. 26, which is secured to a tine spacer 333 by fasteners 334. The tine spacer 333 in turn is secured to the underside of the horizontal portion of the base bracket 305 by fastener 335 as seen best in FIG. 26. It will thus be noted that after the tine assembly has been lowered from its upper, inoperative position by unlatching trigger 321 from trigger catch 322 and moving the entire rake assembly into the lowered, starting position of FIGS. 26-30, by handle 314, the tines 331, and basket rake 325, following insertion between individual slats will move every second or third ladder link in a ladder (depending on the spacing between the tines) to the right passed a just drilled hole, leaving other ladder links on the opposite side of the hole.

Figure 31:
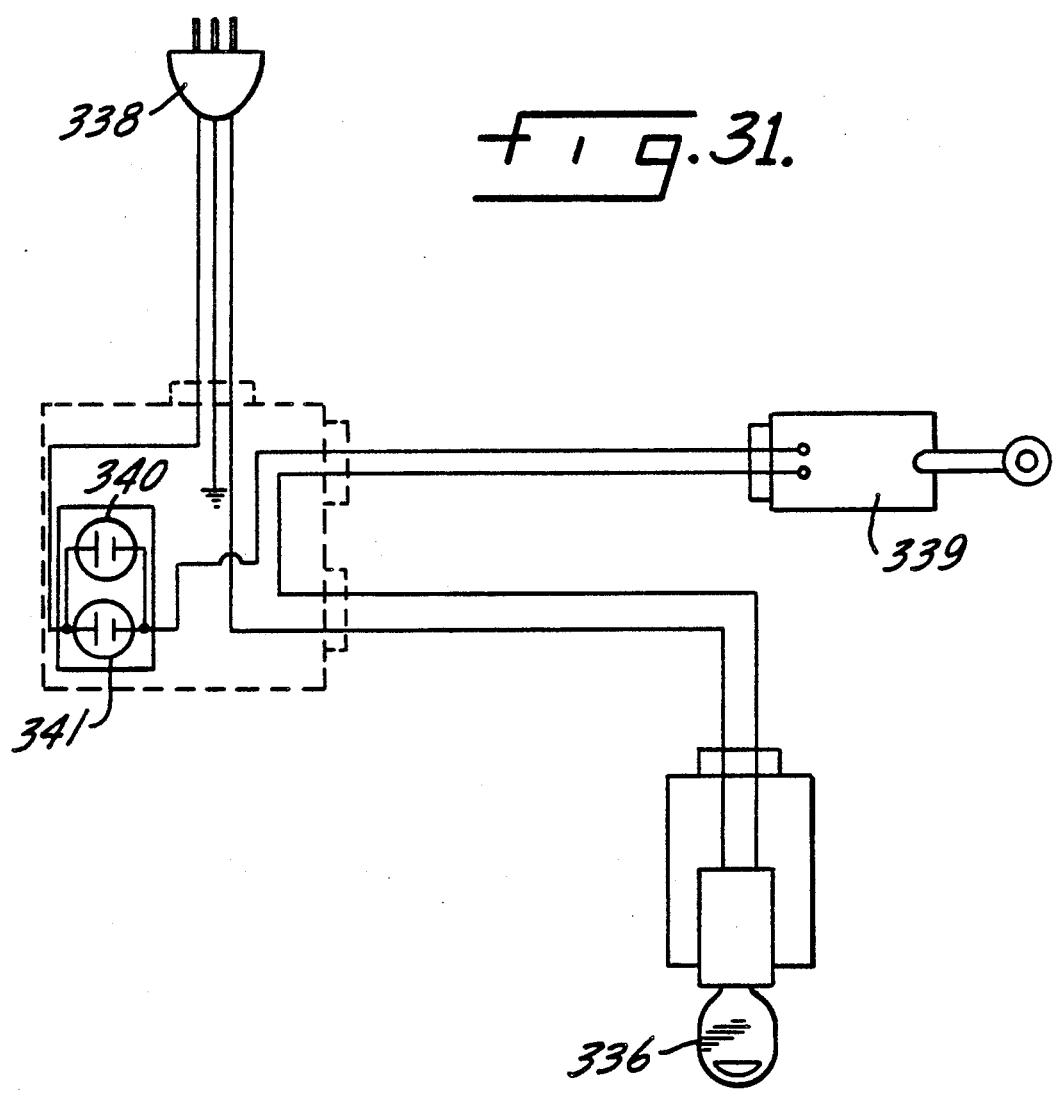
FIG. 31 is a schematic wiring diagram.

The key switch 336 completes an electrical circuit shown best in FIG. 31. The circuit includes a connection 338 to a power source, a limit switch 339 carried by the cut off switch bracket (see FIG. 9), and two plug-in drill sockets 340, 341, one for the fixed drill and one for the moving drill.

USE AND OPERATION

The machine of the present invention is used in the following way to size a mini-blind to an exact width.

Initially, an operator should make sure the machine is off. Depending upon the customer's requirements, an appropriately sized blank is selected, the blank must be larger in both width and length than the customer's window opening. In a work area near the machine, the operator should remove from its packaging the mini-blind which is to be sized, making sure that all components are present. The packaging should be saved for re-use when sizing is completed.

With the machine off, the operator lowers the headrail bar 87 and places the mini-blind in the carrier assembly 12. The wand control of the mini-blind should be to the left, the headrail of the mini-blind should be toward the operator in the headrail bar 87, and the bottom rail of the mini-blind should be away from the operator. The cords ad ladders of the mini-blind should be loosened and the headrail bar lifted up into the locked position. The operator then should slide the slats and headrail of the mini-blind to the left (FIG. 1) into the mini-blind carrier assembly 12. Proper alignment of the slats and headrail is important in order to obtain a straight edge on the cut end of the mini-blind.

With the cut off blade assembly 15 in the open position, the operator then turns the hand crank assembly 11, moving the carrier assembly 12 so that the correct desired length is indicated in the view finder 17. For longer mini-blinds which have a desired length of greater than 36 inches, the center support assembly 18 should be raised and positioned between guides 113 and 121.

Once the mini-blind is in the proper position for cutting, the operator should check again to verify that the slats and headrail are aligned to the left. The operator should then firmly clamp the mini-blind in place by pulling clamps 20.

The operator then turns the machine on with the key switch assembly 21, pushes the pump engage assembly 22 and begins pumping the pump operating handle 23. As cutting of the mini-blind slats occurs, the stationary drill assembly 25 and the moveable drill assembly 26 will perforate the slats at appropriate aligned locations. The cutter blade assembly 15 will reach its closed position when cutting of the mini-blind is completed, and an audible "snap" will occur when the headrail is cut.

When cutting of the slats and headrail is completed, the operator pulls out the pump engaging assembly 22. Then, the mini-blind tiltor bar, a metal rod used to adjust the rotational position of the slats, should be cut with the tiltor bar cut off assembly 19, and the excess rod discarded.

Once all cuts are made, the clamps 20 should be loosened and the slats spread slightly. The lader rake assembly 27 is lowered so that tines 331 (FIG. 28) are positioned between some of the slats. The ladders are then moved into positions relative to the holes drilled by the drill assemblies 25 and 26, whereby a cord threaded through the holes will weave its way through the ladder, some of the ladder sections being positioned on alternating sides of the cord. With the tying of the cord, the sizing of the mini-blind is complete. The mini-blind can be re-packaged and taken home by the customer.

Although a specific embodiment of the invention has been illustrated and described, it will at once be apparent to those skilled in the art that modifications can be made without departing from the spirit and scope of the invention. Accordingly, it is intended that the scope of the invention should not be limited by the foregoing description but, rather, solely by the hereafter appended claims when interpreted in light of the relevant prior art.

What is claimed is:

1. A method of sizing a mini blind having a plurality of slat means and a first ladder means at an undisturbed end of said slat means and a second ladder means at a cuttable end of said slat means to an exact, specified width at the time of purchase by an operator, said method including the steps of:

locating the second ladder means at the cuttable end of the mini blind in a position remote from the final position of the ladder cord, forming the mini blind into a rigid structure, forming an aperture through the rigid structure for a ladder cord for the second ladder means, sizing the mini blind to the specified width by separating excess mini blind material from the balance of the mini blind, positioning several of the ladder links of the second ladder means on each side of the aperture, and threading a ladder cord through the aperture and securing it in fixed relationship to the lower portion of the slat means.

2. The method of claim 1 further characterized by and including the steps of:

sizing a horizontal slat means tiltor bar to the required width.

3. The method of claim 2 further characterized in that:

the horizontal tiltor bar is sized to width prior to separation of the excess mini blind material from the balance of the mini blind.

4. The method of claim 1 further characterized in that the separated excess of the blind includes head rail means.

5. The method of 1 further characterized in that the excess of the mini blind material is separated from the balance of the mini blind by cutting.

6. The method of claim 5 further characterized in that:
the steps of forming the aperture for the second ladder means and cutting the excess of the mini blind material occurs substantially simultaneously.

7. The method of claim 6 further characterized by and including the step of
simultaneously indicating the final position of third ladder means as the final specified width of the mini blind is established prior to sizing.

8. The method of claim 4 further characterized in that
positioning of the several ladder links of the second ladder means on each side of the aperture is accomplished by
firstly, loosening the rigid structure, and,
secondly, thereafter moving said several ladder links of the second ladder means to the cut end side of the aperture while said slat means are in a loosened condition.

9. Apparatus for sizing a mini blind having a plurality of slat means to an exact, specified width at the time of purchase, said apparatus including
means for supporting a mini blind in a position to be cut to a specified width,
means for cutting all elements of the mini blind which have a dimension greater than the specified width, to the specified width,
means for forming a ladder cord aperture in the mini blind at a location adjacent the cut end of the mini blind, and
means for placing several of a plurality of ladder links which comprise a portion of a ladder means on the cut end side of the aperture and for placing several of said plurality of ladder links on the opposite side of the aperture
whereby, when a ladder cord associated with said ladder means is threaded into said aperture and fixed with respect to the lower most portion of the mini blind, said ladder means is substantially precluded from displacement in either direction from the ladder cord.

10. The apparatus of claim 9 further characterized by and including
means for enabling the cutting of the slat means of the mini blind and the forming of the aperture through the slat means to occur substantially simultaneously.

11. The apparatus of claim 9 further including
clamp means for maintaining the slat means as a rigid body during the cutting of the slat means and the forming of the aperture in said slat means at the cut end portion of the mini blind.

12. The apparatus of claim 9 further including
means for automatically indicating the correct location of additional ladder means upon establishing the specified width.

13. The apparatus of claim 12 further characterized in that
said means for automatically indicating the correct location of additional ladder means operates simultaneously with the establishing of the specified final width.

14. The apparatus of claim 9 further including additional ladder cord aperture forming means.

15. The apparatus of claim 14 further including means for automatically disengaging said additional ladder cord aperture forming means until a minimum mini blind width is reached or exceeded.

16. The apparatus of claim 9 further characterized in that
the means for cutting all elements and for forming a ladder cord aperture are manually operated.

17. A method of sizing a mini blind having a plurality of slat means and a first ladder means at an undisturbed end of said slat means and a second ladder means having a plurality of rungs at a cuttable end portion of said slat means to an exact, specified width at the time of purchase by an operator, said method including the steps of
locating the second ladder means in a position remote from its final position,
forming at least the slat means of the mini blind into a rigid structure,
sizing the mini blind to the specified width by separating excess, unwanted mini blind material, including excess portions of the slat means, while maintained as a rigid structure, from the balance of the mini blind,
forming an aperture for a lift cord associated with the second ladder means through the slat means while they are maintained as a rigid structure,
positioning at least one ladder rung of the second ladder means on each side of the formed aperture and
threading lift cord means through the apertured slat means and securing said lift cord means in fixed relationship to the lower portion of the mini blind.

18. The method of claim 17 further characterized by and including the steps of
sizing a horizontal slat means tiltor bar to the required width.

19. The method of claim 18 further characterized in that:
the horizontal slat means tiltor bar is sized to width prior to separation of the excess mini blind material from the balance of the mini blind.

20. The method of claim 17 further characterized in that
the separated excess of the blind material includes head rail means.

21. The method of claim 17 further characterized in that
the excess of the mini blind material is separated from the balance of the mini blind by cutting.

22. The method of claim 21 further characterized in that
the steps of forming the aperture for the lift cord means associated with the second ladder means and cutting the excess, unwanted mini blind material occurs substantially simultaneously.

23. The method of claim 17 further characterized in that
positioning of the several ladder rungs of the second ladder means on each side of the aperture is accomplished by
firstly, loosening the slat means from their rigid condition, and,
secondly, thereafter locating several ladder rungs of the second ladder means on each side of the cut end aperture while said slat means are in a loosened condition.

24. A method of sizing a mini blind having a plurality of slat means and a first ladder means at an undisturbed end of said slat means, and additional ladder means, said additional ladder means including at least a second ladder means having a plurality of rungs at a cuttable end portion of said slat mans, and a third ladder means having a plurality of rungs which is intended to be located in a final position intermediate said first and second ladder means, to an exact specified width at the time of purchase by an operator, said method including the steps of locating the second and third ladder means in positions remote from their final positions, forming at least the slat means of the mini blind into a rigid structure, sizing the mini blind to the specified width by separating excess, unwanted mini blind material, including excess portions of the slat means while maintained as a rigid structure, from the balance of the mini blind.

forming apertures for a liftcord associated with at least the first of the additional ladder means through the slat means while they are maintained as a rigid structure, positioning at least one ladder rung of each of the additional lift cord means on each side of an associated aperture formed in the slat means, and threading lift cord means through the apertures associated with the second and third ladder means and securing said lift cord means in fixed relationship to the lower portion of the mini blind.

25. The method of claim 24 further characterized by and including the steps of sizing a horizontal slat means tiltor bar to the required width.

26. The method of claim 25 further characterized in that:

the horizontal slat means tiltor bar is sized to width prior to separation of the excess mini blind material from the balance of the mini blind.

27. The method of claim 24 further characterized in that the separated excess of the blind material includes head rail means.

28. The method of claim 24 further characterized in that the separated excess of the blind material includes head rail means and bottom rail means.

29. The method of claim 24 further characterized in that the excess of the mini blind material is separated from the balance of the mini blind by cutting.

30. The method of claim 29 further characterized in that the steps of forming the aperture for the ladder means and cutting the excess, unwanted mini blind material occurs substantially simultaneously.

31. The method of claim 28 further characterized in that positioning of the several ladder rungs of the additional ladder means on each side of their associated aperture is accomplished by firstly, loosening the slat means from their rigid condition, and secondly, thereafter locating several ladder rungs of each additional ladder means each side of their associated aperture while the slat means are in a loosened condition.

32. A method of sizing a mini blind having a plurality of slat means to an exact specified width at the time of purchase by an operator, said method including the steps of locating a mini blind composed of a plurality of slat means and having first ladder means associated with a first end of the blind and second ladder means associated with the second end of the blind in a position to be sized to a desired dimension. at least said first ladder means being initially located a predetermined distance from its associated first end of the blind and longitudinally fixed with respect to the longest dimension of the slat means, and sizing the mini blind to the final specified width by separating excess slat means, said sizing being carried out without changing the longitudinal relationship of at least said first ladder means with respect to the slat means, to thereby provide a mini-blind of the specified width with first and second ladder means substantially equally spaced from their associated slat means ends.

33. Apparatus for sizing a mini blind having a plurality of salt means and head rail means to an exact, specified width at the time of purchase, said apparatus including means for supporting a mini blind in a position to be cut to a specified width, means for cutting all elements of the mini blind which have a dimension greater than the specified width, to the specified width, means for forming a lift cord aperture in at least the slat means at a location adjacent to a cut end of the slat means, and means for placing several of the ladder rungs which form a portion of a ladder means on the side of an aperture associated with a cut end portion of the slat means and for placing several of said ladder rungs on the opposite side of the said aperture whereby, when a lift cord associated with said ladder means is threaded into said aperture and fixed with respect to the lower most portion of the mini blind, said ladder means is substantially precluded from displacement in either direction from the lift cord.

34. The apparatus of claim 33 further characterized by and including means for enabling the cutting of the slat means of the mini blind and the forming of the aperture through the salt means to occur substantially simultaneously.

35. The apparatus of claim 33 further including clamp means for maintaining the slat mans as a rigid body during the cutting of the slat means and the forming of the aperture in said slat means at the cut end portion of the mini blind.

36. The apparatus of claim 33 further including clamp means for maintaining the slat means as a rigid body during the cutting of the slat means and the forming of the aperture in said slat means at the cut end portion of the miniblind.

37. The apparatus of claim 33 further including means for automatically indicating the correct location of additional ladder means upon establishing the specified width.

38. The apparatus of claim 37 further characterized in that said means for automatically indicating the correct location of additional ladder means operates simultaneously with the establishing of the specified final width.

39. The apparatus of claim 33 further including additional lift cord aperture forming means.

40. The apparatus of claim 39 further including means for automatically disengaging said additional ladder cord aperture forming means until a minimum mini blind width is reached or exceeded.

41. The apparatus of claim 33 further characterized in that
means for cutting all elements and for forming a lift cord aperture are manually operated.

42. The apparatus of claim 33 further including
clamp means for maintaining the slat means and the head rail means as a rigid body during the cutting of the slat means and the forming of the aperture in said slat means at the cut end portion of the blind, and
means for moving the head rail means away from the slat means prior to threading a lift cord into the aperture formed in the slat means.

43. The apparatus of claim 42 further including
means for de-rigidifying the slat means prior to placing several ladder rungs on each side of the aperture.

44. The apparatus of claim 43 further including
a plurality of tines having a thickness capable of being received between adjacent slats in the slat means when said slat means are de-rigidified, and
means for moving said tines into operative positions between several adjacent slats and moving the ladder rungs between adjacent slats longitudinally along the slat means to a position in which rungs which have been moved by the tines lie on one side of the aperture, and other rungs lie on the other side of the aperture.

45. The apparatus of claim 33 further including
means for de-rigidifying the slat means prior to placing several ladder rungs on each side of the aperture.

46. The apparatus of claim 45 further including
a plurality of tines having a thickness capable of being received between adjacent slats in the slat means when said slat means are de-rigidified, and
means for moving said tines into operative positions between several adjacent slats and moving the ladder rungs between adjacent slats longitudinally along the slat means to a position in which rungs which have been moved by the tines lie on one side of the aperture, and other rungs lie on the other side of the aperture.

* * * * *

(12) REEXAMINATION CERTIFICATE (4315th)

United States Patent
Graves et al.

(10) Number: US 4,993,131 C1
(45) Certificate Issued: Apr. 24, 2001

(54) METHOD AND APPARATUS OF INFINITELY SIZING A MINI BLIND

(75) Inventors: Delbert B. Graves, Nora; Roger L. Anderson, McConnell, both of IL (US)

(73) Assignee: Newell Window Furnishings, Inc., Freeport, IL (US)

Reexamination Request:
No. 90/005,152, Oct. 20, 1998

Reexamination Certificate for:
Patent No.: 4,993,131
Issued: Feb. 19, 1991
Appl. No.: 07/234,709
Filed: Aug. 19, 1988

(51) Int. Cl.$^7$ .............. B23D 19/04; B26D 1/00
(52) U.S. Cl. .................. 29/24.5; 29/433; 83/13
(58) Field of Search .................. 29/24.5, 26 A, 29/26 R, 564, 565; 144/5, 35.1; 408/24, 53; 299/401.1, 445, 411, 412; 493/343, 344, 940, 941, 966; 160/84.04, 84.05; 83/13

(56) References Cited

U.S. PATENT DOCUMENTS

| | | | |
|---|---|---|---|
| 421,027 | * | 2/1890 | Hammond ............................ 29/26 R |
| 1,382,433 | * | 6/1921 | McCarty ............................ 408/53 X |
| 1,647,254 | * | 11/1927 | Simmons . |
| 2,631,508 | * | 3/1953 | Muehling ........................ 493/941 X |
| 2,644,520 | | 7/1953 | Nelson . |
| 2,789,639 | | 4/1957 | Lorentzen . |
| 3,292,232 | * | 12/1966 | Nilsson ................................ 29/24.5 |
| 3,564,893 | | 2/1971 | Richards . |
| 3,677,117 | * | 7/1972 | Cutter ................................... 83/150 |
| 3,766,815 | * | 10/1973 | Edixhoven ............................ 83/160 |
| 4,270,253 | * | 6/1981 | Herb et al. ............................ 29/26 A |
| 4,338,710 | * | 7/1982 | Stursa et al. ........................ 29/26 A |
| 4,407,614 | * | 10/1983 | Muhr et al. ........................ 408/53 X |
| 4,545,100 | | 10/1985 | Gailard et al. . |
| 4,567,930 | | 2/1986 | Fischer . |
| 4,639,987 | | 2/1987 | Georgopoulos . |
| 4,730,372 | | 3/1988 | Tsuchida . |
| 4,790,226 | | 12/1988 | Tsuchida . |
| 4,807,363 | | 2/1989 | Clifton . |
| 4,819,530 | | 4/1989 | Huang . |
| 4,823,449 | | 4/1989 | Chang . |
| 4,876,795 | | 10/1989 | Chun-cheng . |
| 4,907,325 | | 3/1990 | Hsu . |
| 4,907,337 | * | 3/1990 | Krüsi ................................ 29/26 A X |

FOREIGN PATENT DOCUMENTS

| | | |
|---|---|---|
| 0 273 535 | 7/1988 | (EP) . |
| 868348 | 7/1987 | (ZA) . |

* cited by examiner

*Primary Examiner*—Samuel T. Hughes

(57) ABSTRACT

A method of shortening the width, that is, sizing a mini blind to any specified dimension by an operator having the skill level found in a retail outlet, is disclosed. In addition, a machine for sizing a mini blind to any specified dimension by an operator having the skill level found in a retail outlet is also disclosed. The method and machine are applicable to mini blinds which require either one or several ladders to be affixed to the blind and hence the operation of one or more drill systems, the number being proportional to the width of the blind.

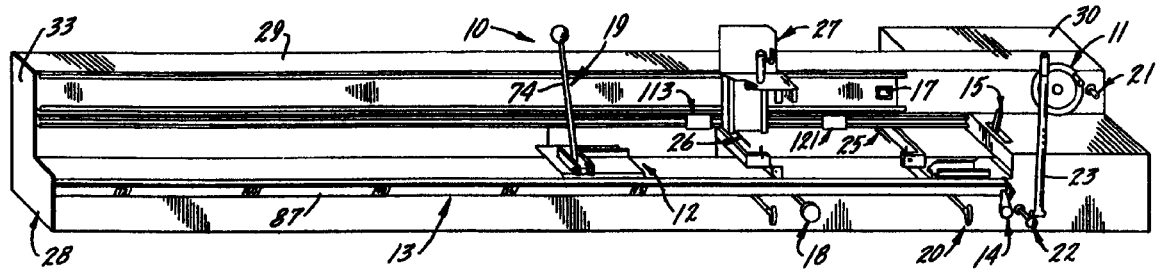

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–31 and 33–46 is confirmed.

Claim 32 is cancelled.

New claims 47 and 48 are added and determined to be patentable.

*47. A method of sizing a mini blind having a plurality of slat means to an exact specified width at the time of purchase by an operator, the method including the steps of:*

*locating a mini blind composed of a plurality of slat means and having first ladder means associated with a first end of the blind and second ladder means associated with the second end of the blind in a position to be sized to a desired dimension, at least said first ladder means being initially located a predetermined distance from its associated first end of the blind and longitudinally fixed with respect to the longest dimension of the slat means, and*

*sizing the mini blind to the final specified width by separating excess slat means while the slats are collapsed,*

*said sizing being carried out without changing the longitudinal relationship of at least said first ladder means with respect to the slat means,*

*to thereby provide a mini blind of the specified width with first and second ladder means substantially equally spaced from their associated slat means ends.*

*48. The method of claim 47 wherein sizing the mini blind includes separating excess material from a head rail.*

\* \* \* \* \*